(12) United States Patent
He et al.

(10) Patent No.: US 12,513,631 B2
(45) Date of Patent: Dec. 30, 2025

(54) POWER CONTROL FOR TRANSMISSION ON ONE OR MORE LINKS

(71) Applicant: Apple Inc., Cupertino, CA (US)

(72) Inventors: Hong He, San Jose, CA (US); Ankit Bhamri, Bad Nauheim (DE); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 18/352,842

(22) Filed: Jul. 14, 2023

(65) Prior Publication Data
US 2024/0023035 A1 Jan. 18, 2024

Related U.S. Application Data

(60) Provisional application No. 63/389,749, filed on Jul. 15, 2022.

(51) Int. Cl.
*H04B 7/14* (2006.01)
*H04B 7/155* (2006.01)
*H04W 52/52* (2009.01)

(52) U.S. Cl.
CPC ........ *H04W 52/52* (2013.01); *H04B 7/15507* (2013.01)

(58) Field of Classification Search
CPC ..... H04W 52/52; H04W 24/08; H04W 16/26; H04B 7/15507; H04B 1/0023; H04B 7/11528
See application file for complete search history.

(56) References Cited

U.S. PATENT DOCUMENTS

| | | | |
|---|---|---|---|
| 2021/0306962 A1* | 9/2021 | Abedini | H04B 1/04 |
| 2023/0268982 A1* | 8/2023 | Li | H04B 7/15507 370/315 |
| 2023/0283348 A1* | 9/2023 | MolavianJazi | H04B 7/06952 |
| 2024/0007943 A1* | 1/2024 | Babaei | H04W 48/12 |
| 2024/0022931 A1* | 1/2024 | MolavianJazi | H04L 1/0023 |

OTHER PUBLICATIONS

"Discussion on L1/L2 Signaling for Side Control Information", 3GPP TSG RAN WG1 #109-e, R1-2204322, May 9-20, 2022, 3 pages.

(Continued)

*Primary Examiner* — Abdelnabi O Musa
(74) *Attorney, Agent, or Firm* — Kilpatrick Townsend & Stockton LLp

(57) ABSTRACT

The present application relates to devices and components including apparatus, systems, and methods providing transmission power controls in support of expanding a network coverage. In an example, a device is configured to expand the network coverage and establishes multiple wireless links between a base station and a user equipment (UE). The device can be network-controlled, whereby such controls can include adjusting the transmission power used by the device to transmit on at least one of such wireless links.

20 Claims, 14 Drawing Sheets gNB
108

UE
104

100

(56) References Cited

OTHER PUBLICATIONS

"Discussion on Side control information to enable NR network-controlled repeaters", 3GPP TSG RAN WG1 Meeting #109-e, R1-2204757, May 9-20, 2022, 4 pages.
"Summary#1 on L1/I2 Signaling for Side Control Information", 3GPP TSG RAN WG1 Meeting #109-e, R1-2205237, May 9-20, 2022, 36 pages.
International Patent Application No. PCT/US2023/027474, "International Preliminary Report on Patentability", Jan. 30, 2025, 9 pages.
International Patent Application No. PCT/US2023/027474, "International Search Report and Written Opinion", Oct. 12, 2023, 14 pages.

\* cited by examiner

POWER CONTROL FOR TRANSMISSION ON ONE OR MORE LINKS

CROSS-REFERENCE TO RELATED APPLICATIONS

This application claims the benefit of U.S. Provisional Application No. 63/389,749, filed Jul. 15, 2022, which is hereby incorporated by reference in its entirety.

BACKGROUND

Cellular communications can be defined in various standards to enable communications between a user equipment and a cellular network. For example, Fifth generation mobile network (5G) is a wireless standard that aims to improve upon data transmission speed, reliability, availability, and more. Cellular coverage is a relevant feature for data transmission. In particular, when a user equipment (UE) is within a cell, the UE may be able to exchange data with the cellular network. Otherwise, the UE may not be able to do so.

DETAILED DESCRIPTION

Figure 1:
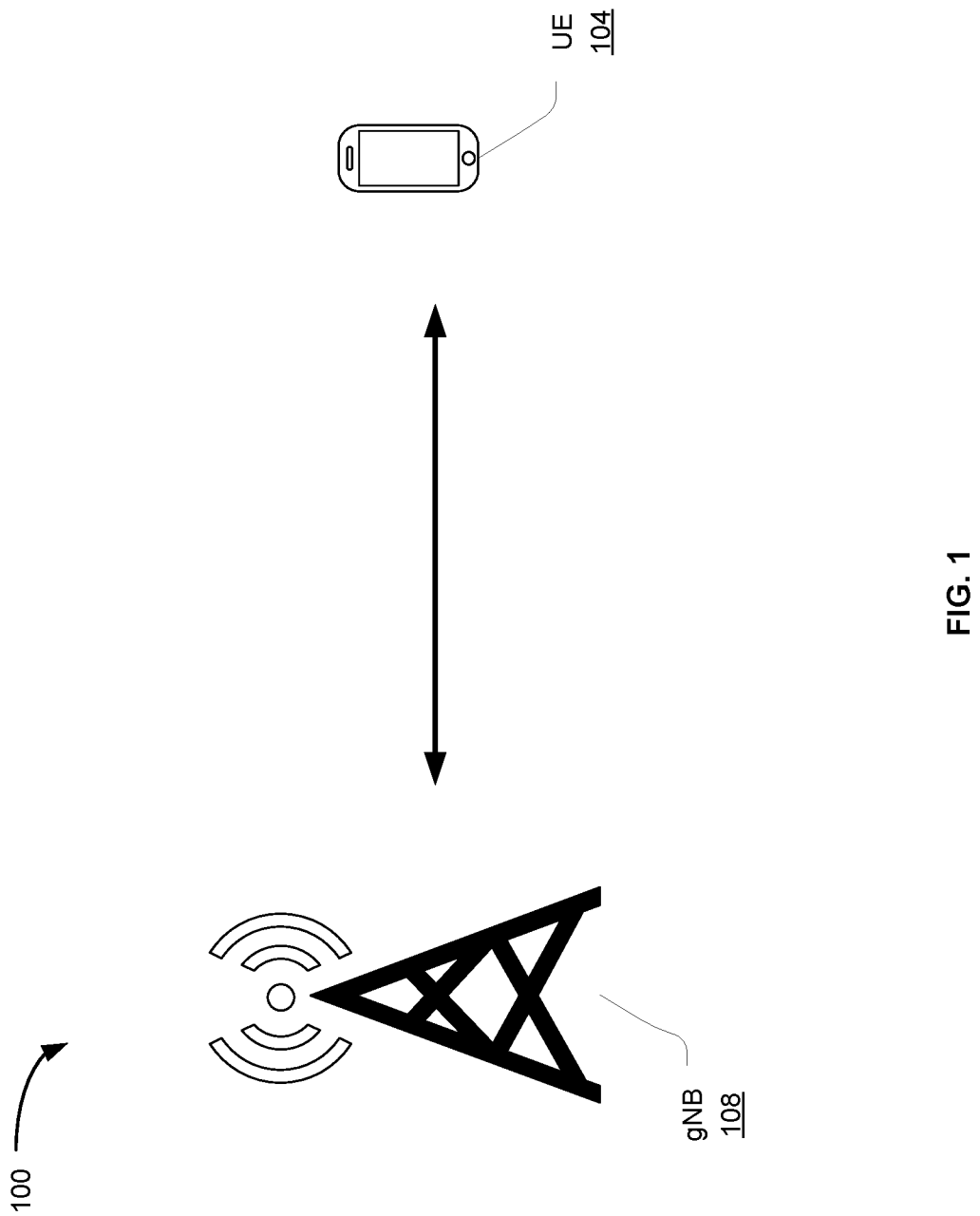
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, when a user equipment (UE) is in a network coverage, the UE may be able to communicate with a network via a base station providing the network coverage. In certain situations, a device, such as a repeater, can be deployed to expand the network coverage, whereby the device is configured as an intermediary node between the base station and the UE. In particular, the device establishes a first link with the base station and a second link with the UE. Data to be exchanged between the base station and the UE are sent over the two links.

The links can be wireless. In this case, the device can support beamforming by including multiple antenna elements that form one or more phased array antennas. Transmission on the first link and/or the second link can use the multiple antenna elements according to beamforming techniques. The power used for the transmission on the first link and/or the second link can be controlled and can dynamically change over time. The transmission power control can be per link and/or can adjust a transmit output power and/or an amplifying gain. Such controls can be indicated by the base station to the device via control information received on a third link, where this link is between the base station and the device. Additionally or alternatively, the device can be pre-configured (e.g., based on a technical specification) or configured via signaling on the third link (e.g., radio resource control (RRC) signaling from the base station) with the different possible transmit output powers and/or an amplifying gains. The device can then determine the transmission power control adjustment to perform based on pre-configured rules and/or control information from the base station. These and other transmission power control features are further described herein below.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "device" as used herein refers to a device with radio communication capabilities, one or more processors, and one or more memory. The device may be configured as a UE. The device may also be configured to expand network coverage and can be referred to as a network coverage device. An example of a network coverage device is a repeater. In a further example, the network coverage device can be controlled by a network (e.g., via a base station of the network). In this case, the network coverage device can be referred to as a network-controlled device, an example of which is a network-controlled repeater.

The term "user equipment" or "UE" as used herein refers to a device with radio communication capabilities and may describe a remote user of network resources in a communications network. The term "user equipment" or "UE" may be considered synonymous to, and may be referred to as, client, device, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The UE may have a primary function of communication with another UE or a network and the UE may be integrated with other devices and/or systems (e.g., in a vehicle).

The term "base station" as used herein refers to a device with radio communication capabilities, that is a device of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include DMRSs for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

Although not illustrated in FIG. 1, the network environment 100 may further include multiple other UEs, with which the gNB 108 can connect in a similar manner as the gNB 108-UE 104 connection. The UE 104 can also connect with another UE by using sidelink channels.

Figure 2:
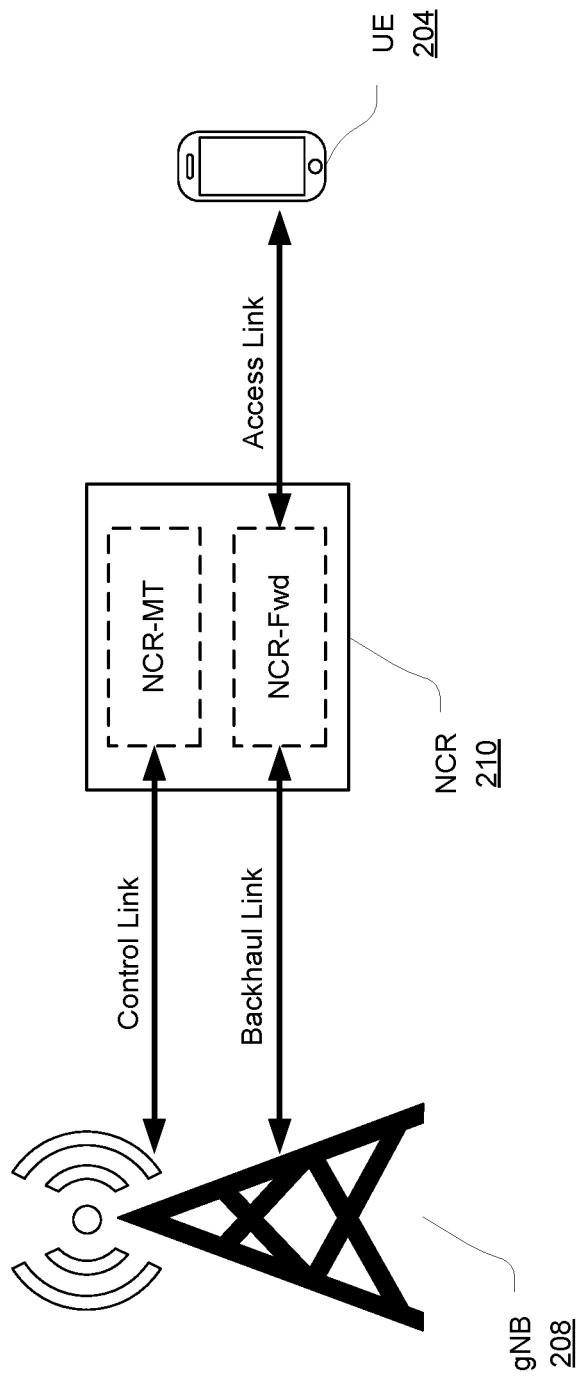
FIG. 2 illustrates an example of improving network coverage, in accordance with some embodiments.

FIG. 2 illustrates an example of improving network coverage, in accordance with some embodiments. A device can be deployed to expand the network coverage, where such device can be configured as an intermediary node between a base station that provides the network coverage and one or more UEs. The device, also referred to herein as a network coverage device, can establish links with the base station and the UE(s). Data to be exchanged between the base station and the UE(s) can be transmitted using signals on such links (these links can be referred to herein as data links or forwarding links). In certain embodiments, the base station (or another network component) can control some or all operations of the network coverage device including, for instance, the output powers and/or amplifying gains used for transmitting the signals on such links. The device can be referred to as a network-controlled device. The controls can be via yet a link between the base station and the device (this link may be referred to as a control link).

In the interest of clarity of explanation, FIG. 2 illustrates a UE 204 in communication with a gNB 208 via a network-controlled repeater (NCR) 210. The NCR 210 is an example of a repeater that expands the network coverage of the gNB 208, whereby the gNB 208 (or another network component) have controls over at least some operations of the repeater (and, thus, the nomenclature of a network-controlled repeater). Nonetheless, the embodiments of the present disclosure are not limited as such. Instead, the embodiments similarly apply to any device, base station, and UEs, where the device can be configured to expand network coverage provided by the base station to the UEs, where this expansion can be effectuated by the device establishing links between the base station and the UEs to facilitate data exchange and, possibly, controls.

As illustrated in FIG. 2, the NCR 210 acts as an intermediary network node. The UE 204 and the gNB 208 are examples of the UE 104 and the gNB 108 of FIG. 1. The NCR 210 establishes a first link, illustrated as and referred to herein as a control link, with the gNB 208. The control link can allow the NCR 210 to at least receive control signaling from the gNB 208. The NCR 210 also establishes a second link, illustrated as and referred to herein as a backhaul link, with the gNB 208. The backhaul link can be a type of a data link usable by the NCR 210 to receive, from the gNB 208, signals carrying data to be sent to the UE 204 and to send, to the gNB 208, signals carrying data of the UE 204. Further, the NCR 210 establishes a third link, illustrated as and referred to herein as an access link, with the UE 204. The access link can be a type of a data link usable by the NCR 210 to receive, from the UE 204, signals carrying data to be sent to the gNB 208 and to send, to the UE 204, signals carrying data of the gNB 208.

In cellular network deployments, network coverage (also referred to as cellular coverage) is a relevant feature. Mobile operators rely on different types of network nodes to offer blanket coverage in their deployments. Deployment of regular full-stack cells is an option, but it may not be always possible (e.g., no availability of backhaul) or economically viable. In comparison, the NCR 210 can be deployed as amplify-and-forward RF repeater by additionally leveraging side control information (SCI) for a repeater: beamforming information (e.g., used to support beamforming techniques that the NCR 210 implements, where the NCR 210 can include one or more phased array antennas), timing information to align transmission/reception boundaries of the repeater, information on uplink-downlink time division duplex (UL-DL TDD) configuration (e.g., such that the NCR 210 can manage utilization of time domain resources), ON-OFF information (e.g., to power ON or OFF) for efficient interference management and improved energy efficiency, and/or power control information for efficient interference management. The SCI can be received from the gNB 208 over the control link. The power control information can be used to adjust the transmission power of the NCR 210 when sending signals on the backhaul link and/or the access link. As used herein adjusting the transmission power can include using a particular transmit output power and/or a particular amplifying gain for one or both of the backhaul link and the access link.

The NCR 210 can implement multiple functions, where a function can be implemented in hardware circuitry only or as a combination of software and hardware (e.g., computer-readable instructions stored in one or more memory, and one or more processors executing such instructions). FIG. 2 illustrates two functions: an NCR mobile termination (MT) and an NCR forwarding (Fwd). The NCR-MT is defined as a function entity to communicate with the gNB 208 via the control link in order to enable the information exchanges including, for instance, side control information. The control link can be based on the NR Uu interface. The NCR-Fwd is defined as a function entity to perform the amplify-and-forwarding of UL/DL RF signals between gNB 208 and UE 204 via the backhaul link and the access link. The behavior of the NCR-Fwd can be controlled according to the received side control information from gNB 208 over the control link.

In an example, the SCI can indicate beamforming information at least for FR2 in association with both fixed beam and adaptive beam. In other words, the gNB 208 can control beamforming of the NCR 210 by indicating the beamforming information in SCI to the NCR 210. The SCI can also indicate ON-OFF information to control the behavior of NCR-Fwd. In particular, the gNB 206 may control the use (e.g., establishment or termination) of the backhaul link and/or access link by indicating the ON-OFF information in the SCI. The indication may be implicit or explicit.

As further described herein below, the SCI may also indicate implicitly or explicitly transmission power adjustments. In other words, power control for the NCR 210 transmissions on either or both the backhaul link and the access link can be supported, whereby the control link may be used for this additional purpose. The power control mechanism can be beneficial in both downlink (DL) and uplink (UL) for NCR-Fwd. For example, a fixed amplifying gain at the NCR 210 may degrade UL performance for the UE 204 when the UE 204 is at the cell edge, or an over-amplified signal can block the gNB'2 208 reception. In the DL direction, a fixed amplifying gain can reduce the NCR's 210 coverage, or signal distortion can saturate the access link. A variety of embodiment are described in this disclosure for the power control mechanisms of the NCR 210 (or, more generally, any device that can be configured to expand network coverage by establishing links between a base station and UEs) such that, for example, the power consumption can be minimized.

Figure 3:
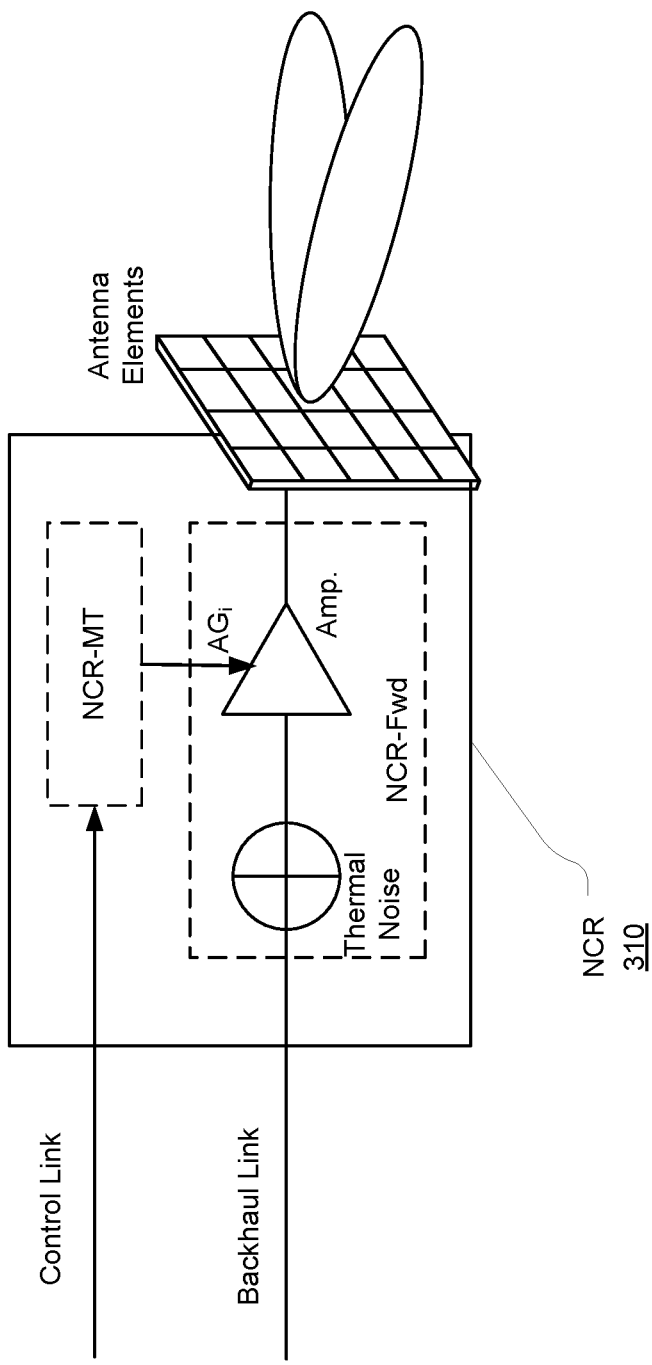
FIG. 3 illustrates an example of a structure for supporting transmission power control, in accordance with some embodiments.

FIG. 3 illustrates an example of a structure for supporting transmission power control, in accordance with some embodiments. The structure can be implemented in an NCR 310, which is an example of NCR 210, or more generally in a device configured to expand network coverage by establishing links between a base station and one or more UEs. The structure is illustrated in association with transmitting RF signals in the DL direction (e.g., to a UE), where such signals carry data received on a backhaul link with a gNB. Nonetheless (and as further illustrated in FIG. 4), a similar structure can be used in association with transmitting RF signals in the UL direction (e.g., to the gNB), where such signals carry data received on an access link with the UE.

The structure includes an amplifier that amplifies a DL signal received from the gNB over the backhaul link. The amplifier can be implemented as part of the NCR-Fwd function of the NCR 310. Thermal noise may exist for different reasons and a corresponding signal may be processed (e.g., noise canceling added, noise signal filtered, etc.) before amplification. The NCR-MT function of the NCR 310 can be used as a control unit to control one or more power control parameters of the NCR-Fwd function including, for instance, amplifying gain of the amplifier and/or the transmit output power used in the transmission of the RF signals via one or more antenna elements of the NCR. The antenna elements can be controlled for beamforming, whereby the RF signals can be transmitted in beams after amplification.

In an example, the NCR 310 can be configured with a set of transmit configurations. A transmit configuration can indicate one or more power control parameters to use for transmitting signals (e.g., RF signals using beamforming techniques). For example, the set of transmit configurations includes N output powers $P_i$ and/or N amplifying gains $AG_i$. Any of or a combination of an output power $P_i$ and an amplifying gains $AG_i$ corresponds to a transmit configuration, such that a set of output powers $P_i$ and/or a set of amplifying gains $AG_i$ are possible, with $0 \leq i < N$ or $1 \leq i \leq N$. N is an integer equal to or greater than two (e.g., N=2, 3, 4, etc.). The set of configurations $P_i$ and/or $AG_i$ can be configured for the NCR 310 via radio resource control (RRC) signaling with the gNB over the control link, operations and management (OAM) activities, or a predefined specification (e.g., predefined in a 3GPP technical specification and stored by the NCR 310 to be compliant with such a specification).

Figure 4:
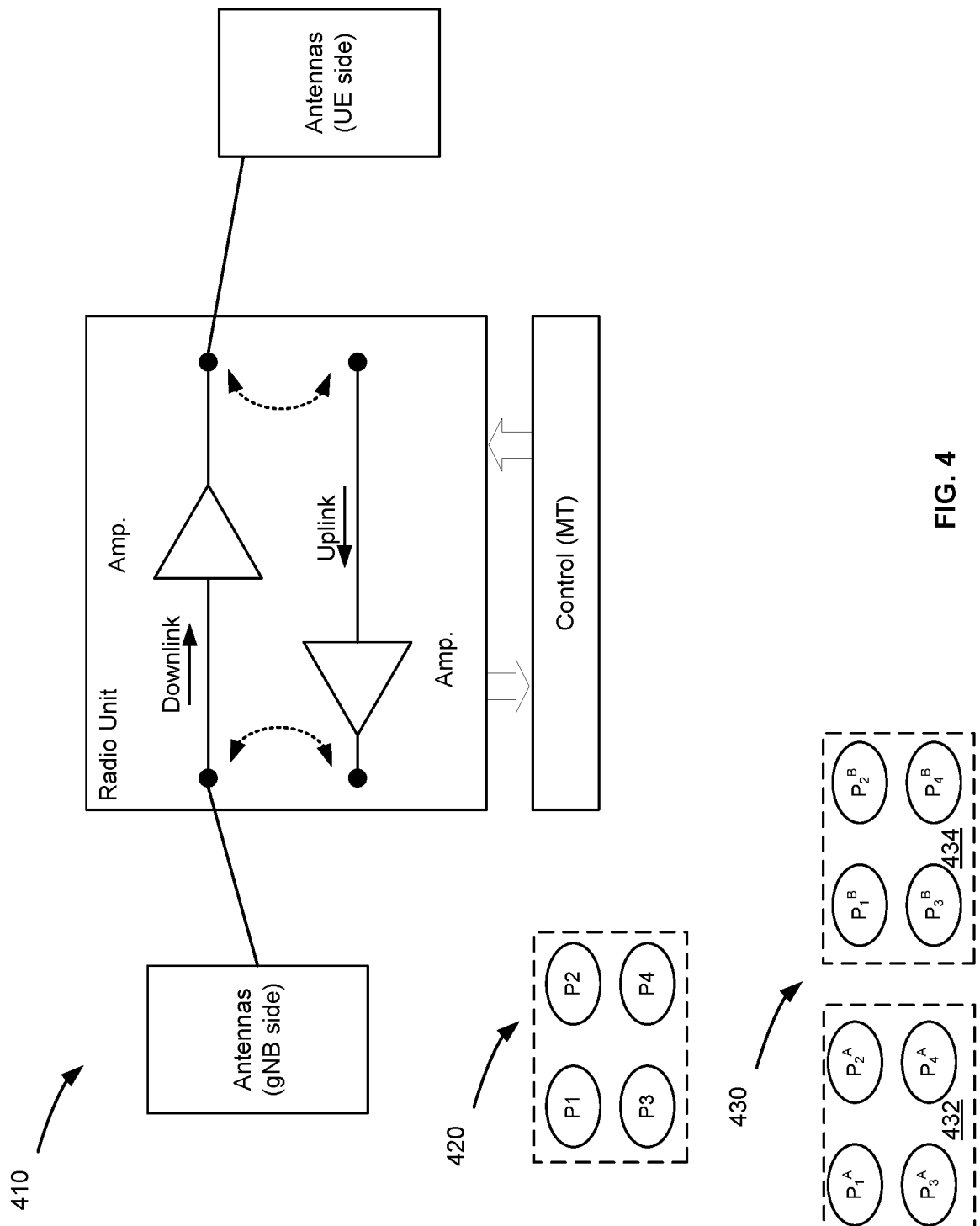
FIG. 4 illustrates an example of a structure for supporting transmission power control on two links, in accordance with some embodiments.

FIG. 4 illustrates an example of a structure for supporting transmission power control on two links, in accordance with some embodiments. The structure can be implemented in an NCR 410, which is an example of NCR 210, or more generally in a device configured to expand network coverage by establishing links between a base station and one or more UEs. The structure is illustrated in association with transmitting RF signals in the DL direction (e.g., to a UE), where such signals carry data received on a backhaul link with a gNB and in association with transmitting RF signals in the UL direction (e.g., to the gNB), where such signals carry data received on an access link with the UE.

The structure includes a radio unit (RU) that can be implemented as part of the NCR's 410 Fwd function. The RU includes a first amplifier that amplifies a DL signal received from the gNB over the backhaul link (e.g., via a set of antennas on the gNB side) for transmission to the UE (e.g., via a set of antennas on the UE side). The RU also includes a second amplifier that amplifies an UL signal received from the UE over the access link (e.g., via a set of antennas on the UE side) for transmission to the gNB (e.g., via a set of antennas on the gNB side). Further, the RU can switch between the DL direction and the UL direction to effectuate DL and UL transmissions based on DL-UL TDD information. Such information can be provided by a control unit implemented as part of the NCR's 410 MT function. In addition, the control unit can indicate one or more power control parameters to control the transmission power in the DL direction and/or the UL direction. Such power control parameters can be defined as part of a set of transmit configurations.

FIG. 4 illustrates two sets of transmit configurations. The NCR 410 can be configured with one or both sets. In the interest of clarity explanation, each set is illustrated to include a particular total number N of output powers $P_i$ that the NCR 410 can support. Nonetheless, each set can include a different total number of output powers $P_i$. Additionally, or alternatively, each set can include a total number of amplifying gains $AG_i$. Further, a different number of sets of transmit configurations is also possible.

A first set 410 of transmit configurations is common to both the backhaul link and the access link. In the illustration of FIG. 4, this first set 420 includes four output powers $P_i$, where 1≤i≤4. Similarly, this first set 420 can additionally or alternatively include the same total number or a different total number of amplifying gains $AG_i$.

In operation, the NCR 410 determines, for the access link, a first transmit output power (e.g., P1 of FIG. 4) from the first set 410 of transmit configurations. Additionally or alternatively, the NCR 410 determines, for the access link, a first amplifying gain (e.g., AG1). Similarly, the NCR 410 determine, for the backhaul link, a second transmit output power from the same first set 410 of transmit configurations. The second transmit output power may be the same as the first transmit output power (e.g., P1) or a different transmit output power (e.g., any of P2, P3, or P4). Additionally or alternatively, the NCR 410 determines, for the backhaul link, a second amplifying gain, which may be the same or different than the first amplifying gain. Further, the NCR 410 transmits a first signal (e.g., a first RF signal in the DL direction) over the access link based on the first transmit output power (and/or the first amplifying gain, as the case may be). Similarly, the NCR 410 transmits a second signal (e.g., a second RF signal in the UL direction) over the backhaul link based on the second output transmit power (and/or the second amplifying gain, as the case may be).

A second set 420 of transmit configurations includes two subsets of transmit configurations. The first subset 432 is specific to the access link (e.g., for use in the DL direction), whereas the second subset 434 is specific to the backhaul link (e.g., for use in the UL direction). In the illustration of FIG. 4, the first subset 432 includes four output powers I'd, and the second subset 434 includes four output powers $P_i^B$, where 1≤i≤4. The values of these transmit output powers may be different (e.g., $P_i^A \neq P_i^B$). Each of the two subsets can additionally or alternatively include the same total number or a different total number of amplifying gains $AG_i$. Further, the total number of power control parameters can be different between the two subsets. The use of two subsets, each specific to a link can be more advantageous that the use of a single set common to the link in certain situations. These situations include, for instance, when victim nodes (e.g., victims of RF interference) are different for the access link and the backhaul link, wherein one victim node is another frequency division multiplexed UE in a same cell and intercell interference exists.

In operation, the NCR 410 determines, for the access link, a first transmit output power (e.g., $P_1^A$ of FIG. 4) from the first subset 432 of transmit configurations. Additionally or alternatively, the NCR 410 determines, for the access link, a first amplifying gain from the first subset 432 (e.g., $AG_1^A$). Similarly, the NCR 410 determine, for the backhaul link, a second transmit output power from the second subset 434 of transmit configurations (e.g., $P_1^B$ of FIG. 4). Additionally or alternatively, the NCR 410 determines, for the backhaul link, a second amplifying gain from the second subset 434 (e.g., $AG_1^B$). Further, the NCR 410 transmits a first signal (e.g., a first RF signal in the DL direction) over the access link based on the first transmit output power (and/or the first amplifying gain, as the case may be). Similarly, the NCR 410 transmits a second signal (e.g., a second RF signal in the UL direction) over the backhaul link based on the second output transmit power (and/or the second amplifying gain, as the case may be).

Figure 5:
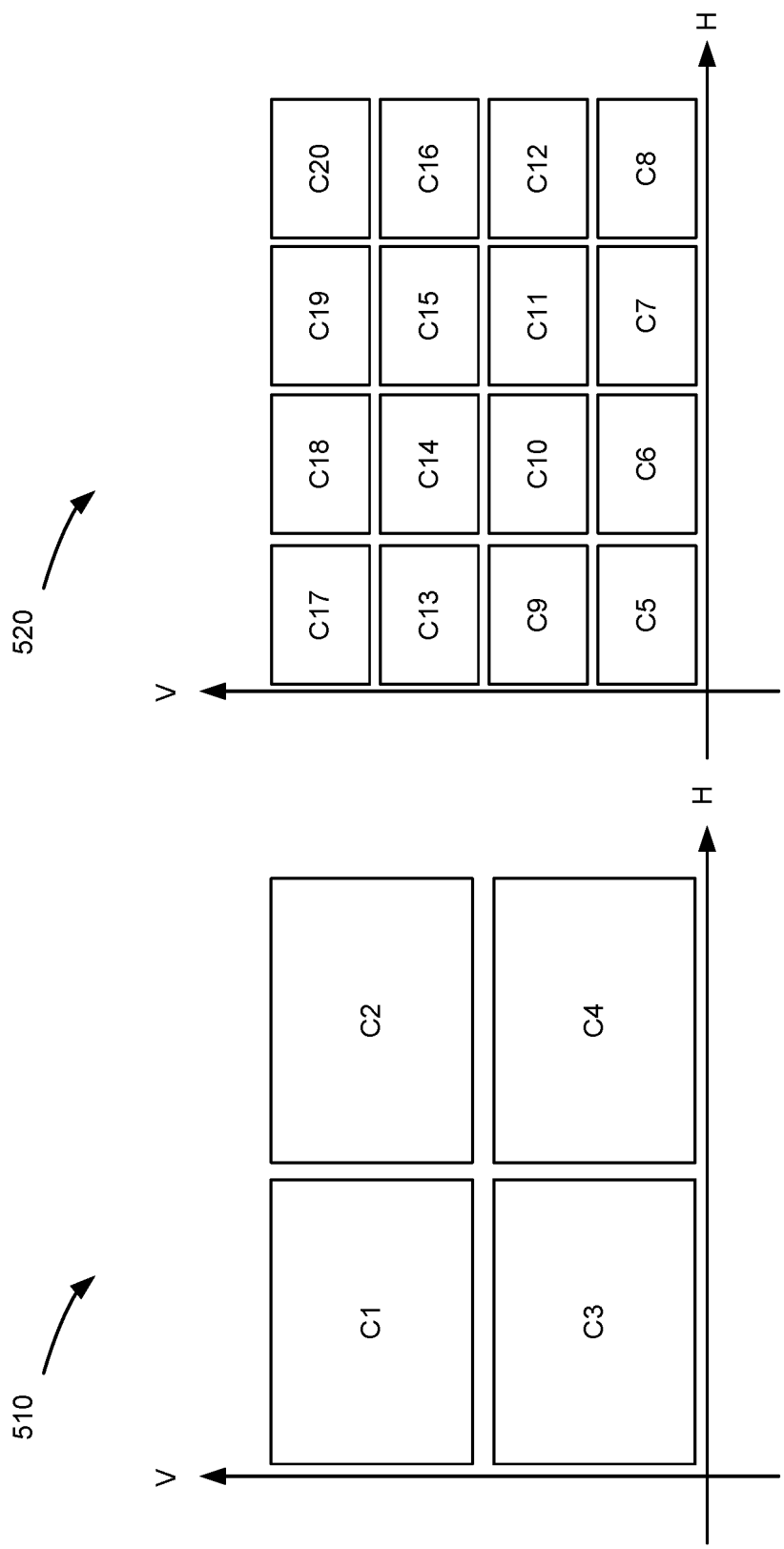
FIG. 5 illustrates an example of a transmission power control based on beam widths, in accordance with some embodiments.

Referring back to FIGS. 3 and 4, an NCR (or similarly a network coverage device controlled, at least in part, by a network or a base station of the network) can be configured with one or more sets of transmit configurations, where each set includes at least two transmit configurations (e.g., at least two power control parameters). Once configured, the NCR can determine transmit control information that indicates at least one of a power control parameter to use (e.g., at least one of a transmit output power or an amplifying gain). The transmit control information can be implicitly indicated to the NCR, as illustrated in FIG. 5, based on other control information received from the gNB (or, more generally, a base station) over a control link. Additionally or alternative, the transmit control information can be explicitly indicated to the NCR, as illustrated in FIGS. 6-10, by being included in control information received from the gNB over the control link (e.g., by being included in SCI).

FIG. 5 illustrates an example of a transmission power control based on beam widths, in accordance with some embodiments. Generally, certain types of signals can be transmitted using a particular beam width that may be wider than that use for other types of signals. For example, transmission of synchronization signal block (SSB) signals and/or system information block (SIB) signals on an access link uses a wider beam than the transmission of a channel state information reference signal (CSI-RS). Similarly, certain channels can use wider beams than other channels. For example, a broadcast channel uses a wider beam than a unicast channel. To improve network coverage, a transmission using a wider beam can be associated with a larger transmission power (e.g., a lager transmit output power and/or a larger amplifying gain) relative to a transmission using a narrower beam.

Two beam configurations are illustrated in FIG. 5, with the horizontal and vertical planes shown on the x-axis and y-axis respectively. A first beam configuration 510 includes four beams of medium width. A second bean configuration 520 includes sixteen beams of narrow width. Of course, other beam configurations are possible, whereby a different number of beams and/or beam width can be used.

In a first signal type or a first channel type associated with the access link and a second signal type or a second channel type associated with the backhaul channel are associated with a first group. A third signal type or a third channel type associated with at least one of the access link or the backhaul link are associated with a second group. In turn, the first group is associated with a first transmit configuration that indicates at least one a first transmit output power or a first amplifying gain. The second group is associated with a second transmit configuration that indicates at least one a second transmit output power or a second amplifying gain.

To illustrate this grouping and transmission power controls, reference is made to the two beam configurations 510 and 520 and particular signal types and channel types. The first group can be associated with the first beam configuration 510. The second groups can be associated with the second beam configuration 520. As such, the first group relates to using relatively wider beams compared to the second group. Broadcast channels and/or signals (e.g., SSB and/or SIB) on the access link can be associated with the first group. Physical random access channel (PRACH) resources on the backhaul link can also be associated with the first group. In comparison, remaining channels can be associated with the second group, including unicast data and other channels that is scheduled by DCI (e.g., Msg3/Msg4 during RACH procedure), CSI-RS, etc. The first group is associated with a first transmit output power and/or a first amplifying gain. Likewise, the second group is associated with a second transmit output power and/or a second amplifying gain. Because the first group is associated with using wider transmission beams relative to the second group, the first transmit output power is greater than the second output transmit power and/or the first amplifying gain is greater than the second amplifying gain.

In the above illustration, when a transmission SSB and/or SIB on the access link is to be performed or a PRACH resource is to be sent on the backhaul link, the NCR can use the first transmit output power and/or the first amplifying gain. In comparison, for other signal or channel transmissions on the access link or the backhaul link, the NCR can use the second transmit output power and/or the second amplifying gain.

The NCR can be configured to use different power control parameters for the different groups (where these parameters are defined in transmit configurations associated with the different groups). Once configured, the NCR can determine the relevant power control parameter to use. For example, the first transmit configuration indicates and the second transmit configuration are pre-stored by the NCR based on a predefined specification (e.g., a 3GPP technical specification) or are indicated to the NCR by the gNB based on RRC signaling or media access control (MAC) control element (CE) received by the NCR from the gNB over the control link. Thereafter, the NCR determines that a transmission to be performed is associated with one of the two groups (e.g., the first group instead of the second group), determine the transmit configuration associated with this first group (e.g., the first transmit configuration), and performs the transmission based on the determine transmit configuration (e.g., the first transmit configuration).

In a way, the base station (or more generally the network) implicitly indicates the transmit configuration that the NCR needs to use to perform a transmission. For instance, the SCI information can include UL-DL TDD information indicating a type of signal to be transmitted and/or a type of channel to use for a signal transmission. Based on this SCI-indicated information, the NCR can determine the associated group and the transmit configuration of this group to then perform the transmission.

As such, the use of group-transmit configuration associations can be thought of as a two-step process. In a first step, two transmit output powers or amplifying gains may be hard-encoded or explicitly provided by RRC or MAC-CE using side control information over the control link in a semi-static manner, where P1>P2 and/or AG1>AG2. In a second step, the larger power is used for the first group channels with wider beams and the smaller one is used for the second group channels forwarding to mitigate the inter-cell interference.

Figure 6:
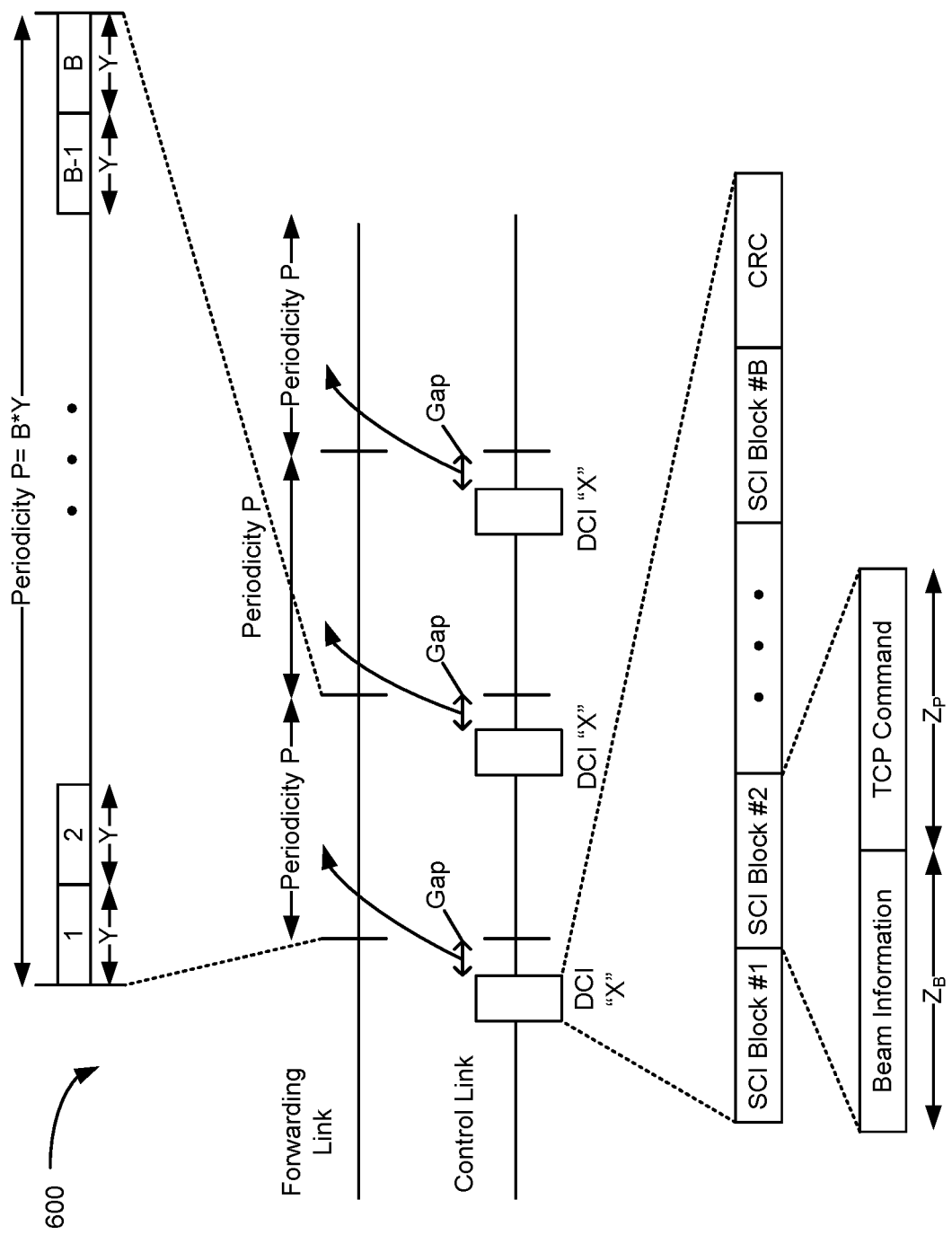
FIG. 6 illustrates an example of downlink control information (DCI) indicating transmission power controls, in accordance with some embodiments.

FIG. 6 illustrates an example 600 of DCI indicating transmission power controls, in accordance with some embodiments. This example 600 represents an explicit indication by a gNB to an NCR (or, more generally, a base station to a network coverage device) about a particular transmit configuration to use for a transmission. Multiple transmit configurations may have been already configured for the UE (e.g., by the gNB via a control link, hard-coded in the NCR based on a technical specification, etc.).

More specifically, the example 600 allows for transmission power control and beam indication based on a semi-static time resource granularity. To do so, the NCR may be provided with various information (e.g., all or portions of this information can be received from the gNB over the control link and/or hard-coded in the NCR based on a technical specification). The information indicates SCI radio network temporary identifier (RNTI) for monitoring a physical downlink control channel (PDCCH) conveying DCI having a DCI format used to indicate at least the transmit control information and beam information. The DCI format is illustrated in FIG. 6 as DCI format "X." The information also indicates periodicity for DCI monitoring (illustrated as periodicity P for DCI format X monitoring in FIG. 6). Further, the information can indicate granularity of time-domain resources, where these resources may be provided by RRC signaling. In certain illustrations, a set of time-domain resource granularities 'Y' maybe first hard-encoded in the NCR based on a technical specification and then explicitly configured by RRC signaling for the NCR. In certain illustrations also, the time-domain resource granularities 'Y' may include Y consecutive symbols in the time domain, where Y is one of {2, 7, 14, 28} symbols.

Based on such information, a DCI format "X" maybe used to indicate SCI. In turn, the SCI can indicate transmit control information and beam information. The transmit control information can indicate a transmit configuration that uses one or more power control parameters, such as a transmit output power and/or an amplifying gain. In an illustration, the transmit control information be included in the SCI as a TPC command represented by a number $Z_P$ of bits as follows. In comparison, the SCI can include $Z_B$ bits representing the beam information. The DCI format indicates B SCI block fields. Each SCI block field corresponds to Y consecutive symbols and includes a beam information field having $Z_B$ bits and a TPC command field having $Z_P$ bits. B is equal to a periodicity for DCI monitoring divided by Y (e.g., B=P/Y). $Z_B$ is based on a total number of candidate beams. $Z_P$ is equal to $\log_2 M$, where M represents a total number of configurable transmit output powers or configurable amplifying gains. In this way, the DCI format "X" includes B sub-field pairs <Beam Information, TPC Command> in B SCI blocks, with a one-to-one mapping between the B sub-field pairs and the B groups of Y consecutive symbols. FIG. 6 illustrates this setup.

In particular, DCI having DCI format "X" is monitored periodically on the control link, with periodicity P. The DCI can be used for transmissions on a forwarding link (e.g., an access link or a backhaul link), where the transmission can start after a gap from the DCI being detected. The gap can be between the last symbol of the detected DCI and the first symbol of the first slot in an associated period. The gap maybe reported by the NCR to the gNB as part of NCR capability. The DCI includes B SCI blocks and cyclic redundancy check (CRC) bits that may be appended after the last SCI block. Each SCI block controls the transmission of Y consecutive symbols on the forwarding link, such that the transmission of B*Y consecutive symbols is possible based on the B SCI blocks. For each Y consecutive symbol, the corresponding SCI block includes $Z_B$ bits indicating beam information and $Z_P$ bits indicating a TPC command, where the beam information and TPC command are used to transmit the Y consecutive symbols.

As such, in operation, the NCR determines a first SCI block included in the DCI (e.g., SCI block #1). The NCR determines first beam information and first TPC command indicated by the first SCI block. The NCR also determines that first Y consecutive symbols are to be transmitted and are associated with the first SCI block (e.g., the Y consecutive symbols under the rectangle labeled "1" in the case of SCI block #1). Then, the NCR transmits the first Y consecutive symbols based on the first beam information and the first TPC command.

In certain situations, an exception may be made, whereby Y consecutive symbols are not to be transmitted. To indicate this exception, the SCI block corresponding to these Y consecutive symbols may not include beam information and/or a TPC command. In other words, when the NCR detects that an SCI block does not indicate beam information and/or a TPC command, the NCR may forgo the transmission of the corresponding Y consecutive symbols. As such, for any Y symbols in a period for each a <Beam Information, TPC Command> indication is not received, a NCR-Fwd may stop forwarding operation on both access link and backhaul link for power saving purpose.

In other situations, an exception may be made, whereby Y consecutive symbols may be transmitted using different beam information and/or transmit control information than what is indicated in the DCI. For instance, particular signal types may be, by default or via configuration, associated with particular beam information and/or a particular transmit control information. In this case, if the NCR determines that the particular signal type is to be transmitted, the NCR can discard the beam information and/or transmit control information indicated by the SCI and, instead, use the particular beam information and/or a particular transmit control information for the transmission. For instance, the SCI indication provided by DCI format "X" maybe inapplicable to SSBs symbols forwarded by NCR on the access link. In such a situation, the NCR may use a transmit output power and/or an amplifying gain that are greater than the one indicated by the TPC command.

As such, per this exception, the NCR determines a first SCI block included in the DCI (e.g., SCI block #1 in FIG. 6) and determines first beam information and first TPC command indicated by the first SCI block. The first TPC command indicates a first transmit output power and/or a first amplifying gain. The NCR also determines that first Y consecutive symbols are to be transmitted, are associated with the first SCI block, and correspond to a signal type (e.g., the Y consecutive symbols under the rectangle labeled "1" in the case of SCI block #1 are SSB symbols to send on the access link). Next, the NCR determines that the signal type is associated with a second transmit output power that is different from (e.g., larger than) the first transmit output power and/or a second amplifying gain that is different from (e.g., larger than) the first amplifying gain. Rather than using the first transmit power and/or the first amplifying gain, the NCR transmits the first Y consecutive symbols based on the second transmit output power and/or the second amplifying gain (e.g., in an RF signal transmitted using second transmit output power and/or the second amplifying gain).

Referring again to the illustration of FIG. 6, consider the situation where four transmit output powers or amplifying gains may be used for power control of the NCR on the access link and the backhaul link. Consequently, $Z_P=2$ bits with one-to-one mapping with different power setting are used. This use is illustrated in Table 1 below. Further, assuming P=2 slots (e.g., twenty-eight symbols) and Y=7 symbols are configured as time-resource granularity, there are B=28/7=4 SCI blocks in a DCI format "X" with one-to-one mapping to "Y=7" consecutive symbols in a period. For each period, the gNB can have the freedom to properly set the values of sub-field pair <Beam information, TPC command> in SCI block fields to control the beam and transmission power.

TABLE 1

| Value of TPC | Power | AG |
|---|---|---|
| 00 | P0 | AG0 |
| 01 | P1 | AG1 |
| 10 | P2 | AG2 |
| 11 | P3 | AG3 |

Figure 7:
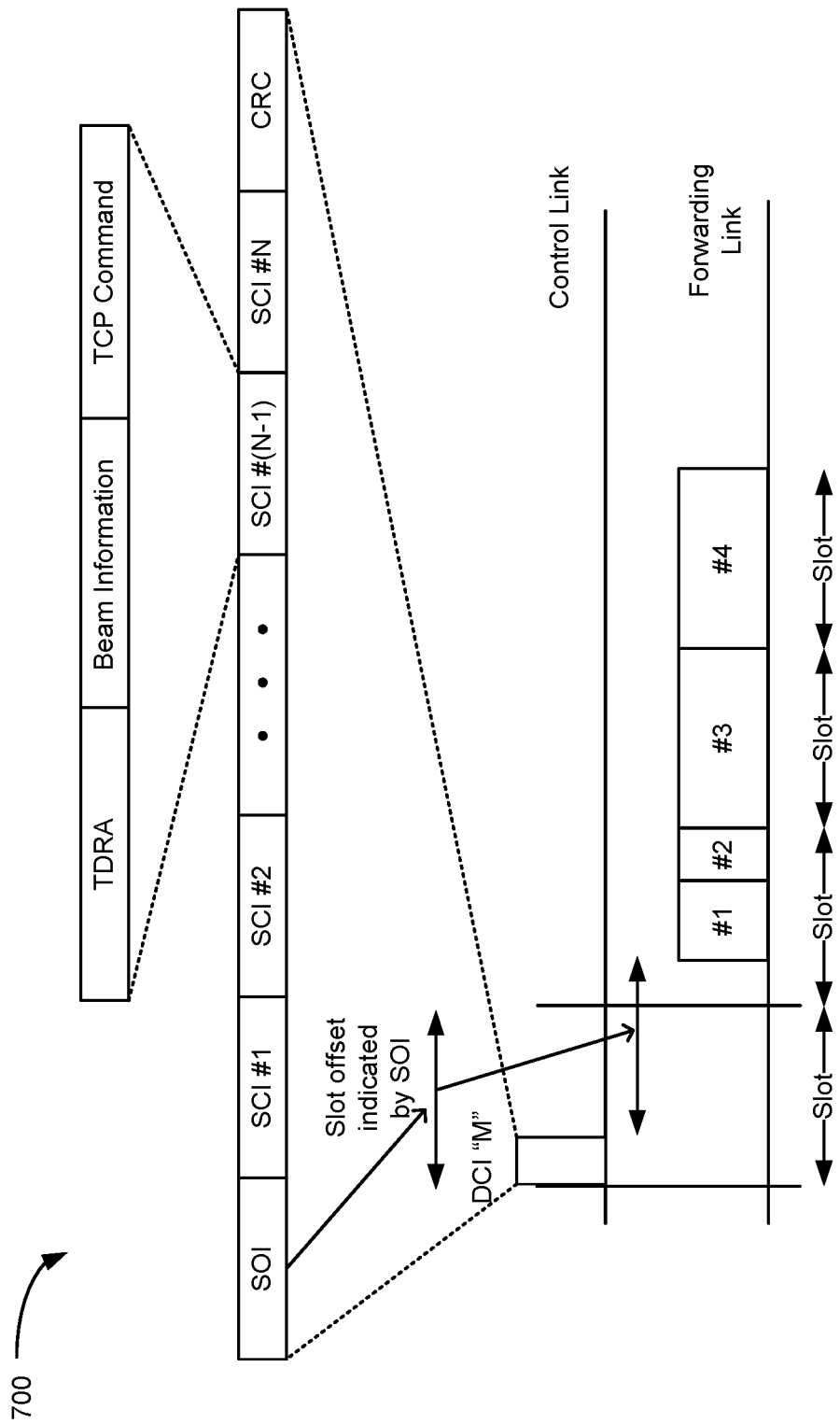
FIG. 7 illustrates another example of DCI indicating transmission power controls, in accordance with some embodiments.

FIG. 7 illustrates another example 700 of DCI indicating transmission power controls, in accordance with some embodiments. This example 700 represents an explicit indication by a gNB to an NCR (or, more generally, a base station to a network coverage device) about a particular transmit configuration to use for a transmission. Multiple transmit configurations may have been already configured for the UE (e.g., by the gNB via a control link, hard-coded in the NCR based on a technical specification, etc.). More specifically, the example 700 allows for transmission power control and beam indication based on a varied time domain resource granularity. In comparison to example 600 of FIG. 6, the example 700 allows more flexibility, where time domain resource allocations (TDRAs) that may not use consecutive symbols can be supported.

To do so, a DCI having a particular format (illustrated in FIG. 7 as DCI format "M") can be used. This DCI can indicate a TDRA, beam information to use for the TDRA, and transmit control information (e.g., a TPC command) to also use for the TDRA. For instance, the DCI format "M" includes N SCI block fields, where N is a positive integer. The value of which can be configured by RRC signaling received by the device from the gNB over the control link. Additionally, or alternative, the value of N can be implicitly determined by the NCR based on a DCI monitoring periodicity P. For instance, Nis equal to P if a single TDRA is allowed for forwarding operation. In both cases, the value of N may be known to the NCR such that the NCR can avoid unnecessary blind decoding. Each SCI block field includes a time domain resource allocation (TDRA) field, and a beam information field, and a TPC command field. As such, for SCI block i, the following sub-fields are included: <TDRA i, Beam Information #i, TPC command #i>. The beam information indication and TPC command indication described in connection with the example 600 of FIG. 6 can be fully reused in the example 700, such that to provide a beam and a transmit power control configuration for the paired TDRA resource.

In addition, the DCI format "M" can include a single slot offset indicator (SOI) field, where the SOI indicated by this field can indicate an offset relative to a start of a slot where the DCI is detected. When a single Soi field is used, DCI format "M" can be used to support one or more multiple consecutive TDRAs, each being associated with a separate beam and transmit power control indication. In this case, the first TDRA field in the detected DCI indicates the starting symbol relative to a first symbol of a starting slot indicated by SOI field and the number of symbols. Each one of the remaining TDRA fields indicates the number of symbols for the corresponding TDRA, assuming continuous TDRAs in the time-domain.

This use of a single SOI field is illustrated in FIG. 7. DCI having DCI format "M" is received on the control link. This DCI includes N SCI block and CRC bits that may be appended at the end of the DCI. In addition, the DCI includes an SOI in an SOI field. Each SCI block indicates a TDRA, beam information, and TPC command. The SOI indicates a slot offset of the first TDRA on the forwarding link. The corresponding slot index for each of the other consecutive TDRAs is determined based on the first TDRA location in the time domain.

Figure 8:
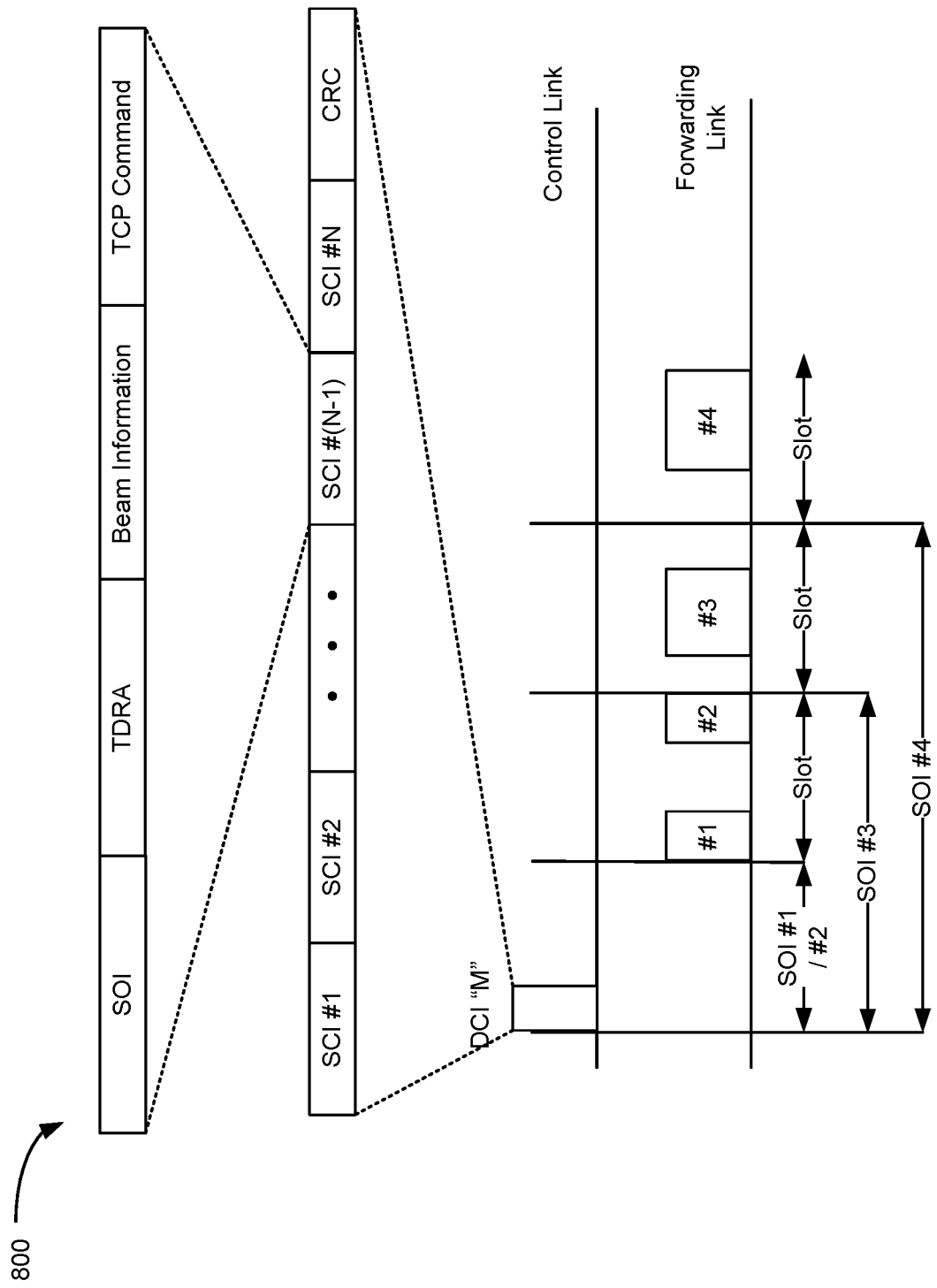
FIG. 8 illustrates yet another example of DCI indicating transmission power controls, in accordance with some embodiments.

FIG. 8 illustrates yet another example 800 of DCI indicating transmission power controls, in accordance with some embodiments. Similar to the example 700 of FIG. 7, the example 800 allows for transmission power control and beam indication based on a varied time domain resource granularity. Similarities between the two examples 700 and 800 are not repeated herein in the interest of brevity. Nonetheless, the description of the DCI format "M" of example 700 equally applies to the DCI format "M" of FIG. 8, with the following differences. Rather than including a single SOI field for all N SCI blocks, each one of the N SCI blocks can include its own SOI field. As such, each SCI block can indicate an offset to use for the TDRA associated with the SCI block. An offset of a TDRA associated with an SCI block field can be an offset relative to a start of a slot where the DCI is detected or relative to an ending symbol of a previous TDRA associated with a different SCI block field. The TDRA field can indicate a starting symbol relative to the first symbol of the starting slot indicated by the SOI field and the length.

In this way, the DCI format "M" of FIG. 8 can support non-consecutive TDRAs in the time domain. Each SCI block includes the following sub-fields: <SOI, TDRA, beam information, TPC command>.

Gaps between TDRA on a forwarding link (e.g., an eaccess link or a backhaul link) can correspond to resources that are to be sent. SCI may not be indicated to the NCR for these resources. Instead, the NCR can use default transmit configuration (e.g., a default transmit output power and/or a default amplifying gain) and/or default beam information. For instance, a gap can correspond to resources that would be used for SSB. In this case, the maximum transmit output power and/or the maximum amplifying gain can be the default transmit configuration that is used.

This use of an SOI field per SCI block is illustrated in FIG. 8. DCI having DCI format "M" is received on the control link. This DCI includes N SCI block and CRC bits that may be appended at the end of the DCI. In turn, each SCI block indicates an SOI, a TDRA, beam information, and TPC command. The SOI indicates a slot offset for the corresponding TDRA on the forwarding link.

Figure 9:
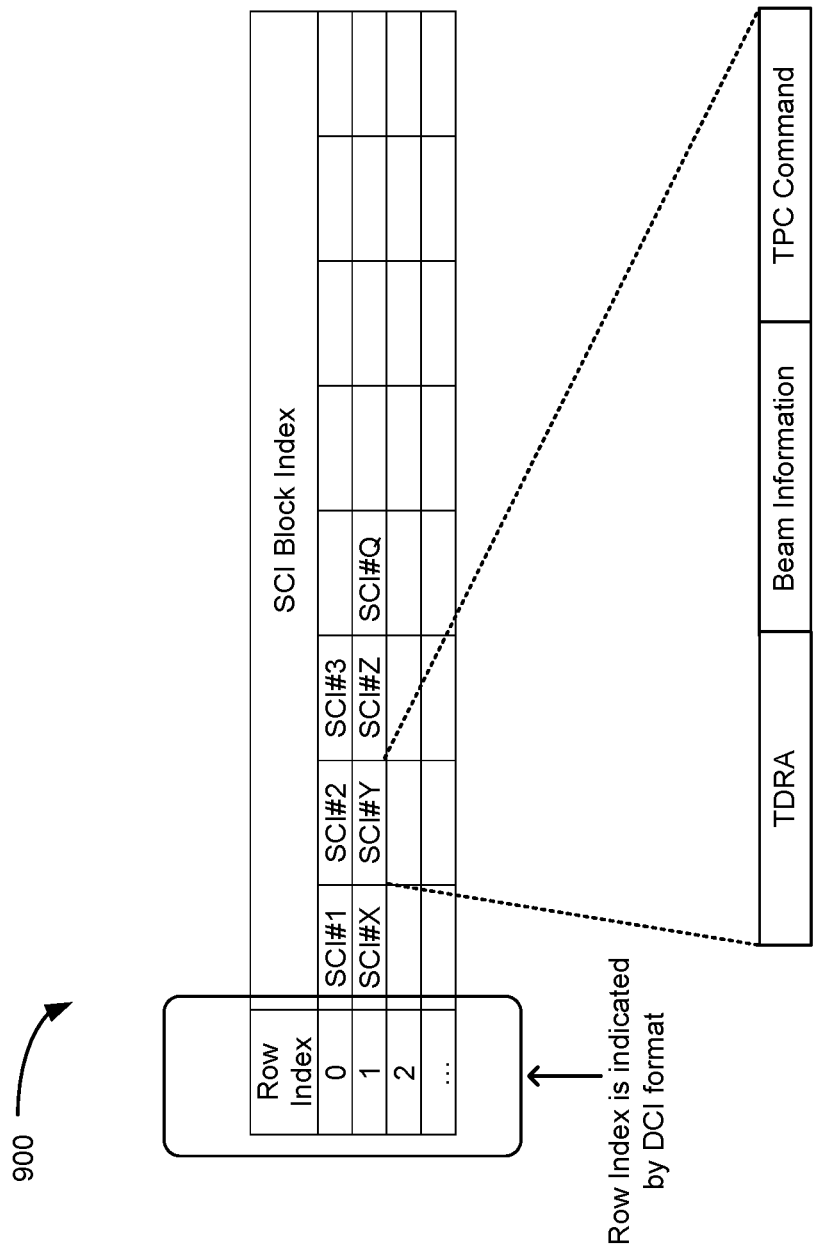
FIG. 9 illustrates a further example of DCI indicating transmission power controls, in accordance with some embodiments.

FIG. 9 illustrates a further example 900 of DCI indicating transmission power controls, in accordance with some embodiments. This example 900 also represents an explicit indication by a gNB to an NCR (or, more generally, a base station to a network coverage device) about a particular transmit configuration to use for a transmission. In comparison to the examples 700 and 800 of FIGS. 7 and 8, the example 900 allows the TDRA flexibility, while also reducing the signaling overhead (e.g., the size of the DCI). In particular, various transmit configurations can be configured (e.g., via RRC signaling) and the DCI can include SCI indicating one of the transmit configurations.

For instance, the NCR stores configuration information indicating SCI blocks. In turn, each SCI block indicates a corresponding TDRA, corresponding beam information, and a corresponding TPC command. The SCI blocks can be stored as various entry in a data structure of the NCR. The NCR can receive, from the gNB over the control link, SCI indicating an entry in the configuration information. The entry can correspond to a first SCI block. The NCR can look up entry from the data structure and determine a first TDRA, first beam information, and a first TPC command from the entry. The first TPC command indicates a first transmit output power and/or or a first amplifying gain. As such, the NCR can transmit a first signal over a forwarding link (e.g., a backhaul link or an access link) based on the first TDRA, the first beam information, and the first TPC command.

In a particular illustration, the configuration information is stored as a table configured by the gNB for the NCR. Each row of the RR-configured table can include K SCI blocks. The value of K may vary between rows. Each cell corresponds to an SCI block. The SCI indicates a row index. This illustration is shown in FIG. 9. In particular, rows of the table are indexed starting with index "0" and on. The SCI included in a detected DCI indicates one of the row indices. The SCI blocks included in the row are used to determine the transmit power controls. In particular, each SCI block #i indicates a TDRA #i, beam information #i for transmission using the TDRA #i, and a TPC command #i for transmission using the TDRA #i.

Figure 10:
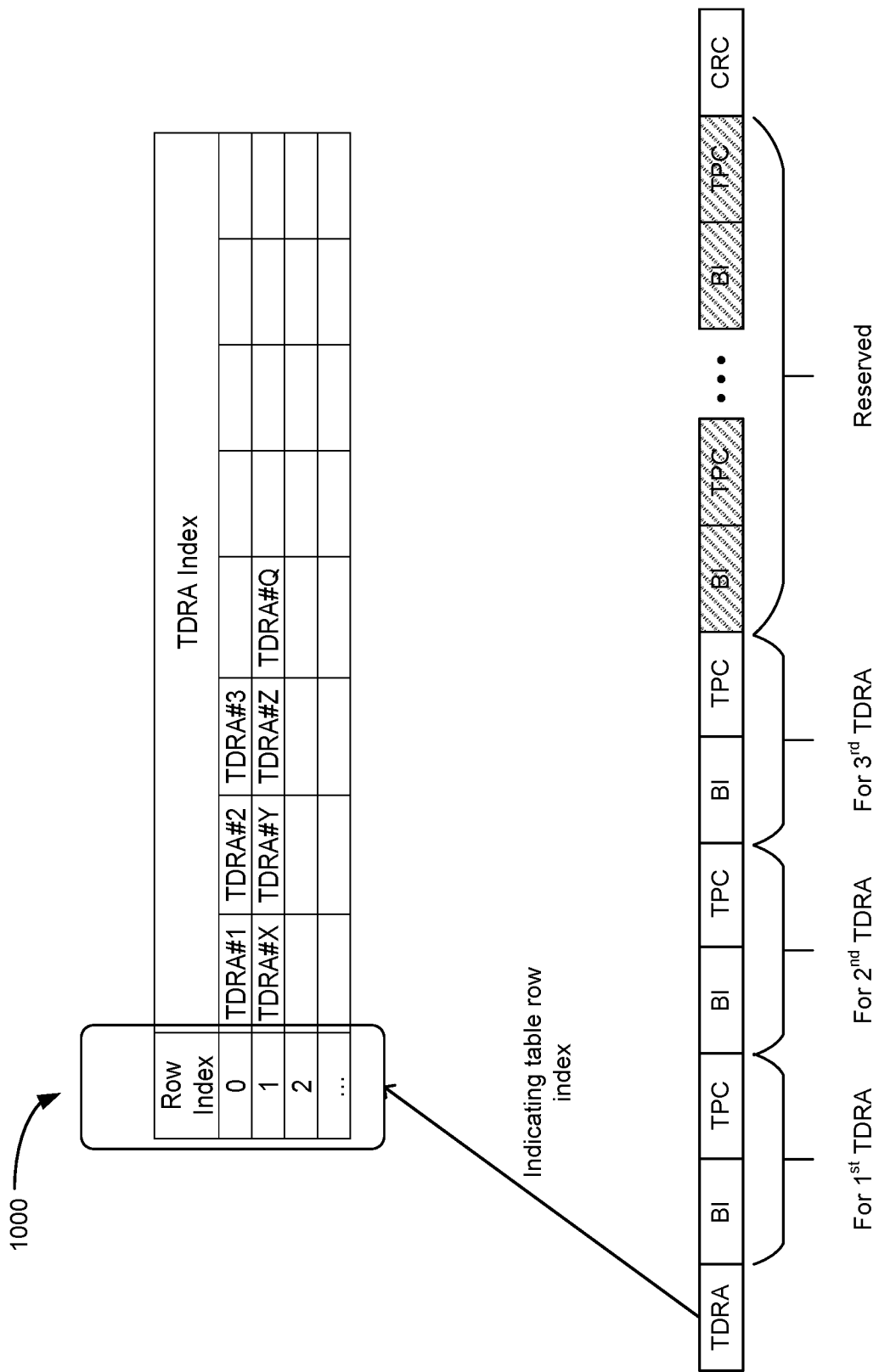
FIG. 10 illustrates an additional example of DCI indicating transmission power controls, in accordance with some embodiments.

FIG. 10 illustrates an additional example 1000 of DCI indicating transmission power controls, in accordance with some embodiments. This example 1000 also represents an explicit indication by a gNB to an NCR (or, more generally, a base station to a network coverage device) about a particular transmit configuration to use for a transmission. In comparison to the examples 700 and 800 of FIGS. 7 and 8, the example 1000 allows the TDRA flexibility, while also reducing the signaling overhead (e.g., the size of the DCI). In comparison to the example 900 of FIG. 9, the example 1000 allows more flexibility.

In particular, the SCI information (e.g., the RRC-configured table) in the example 900 is configured in a semi-static manner which may pose certain restrictions for NCR forwarding. Instead, in the example 1000, the TDRA information is configured a priori (e.g., via RRC signaling to define an RRC-configured table). However, the other SCI information including beam information and/or transmit power information maybe explicitly provided by fields in DCI having a DCI format (referred to herein as DCI format "F"). In particular, the DCI format "F" can include multiple fields, such as a TDRA field for a configuration index in the TDRA information (e.g., a row index in the RRC-configure table). The configuration index can indicate multiple TDRAs (e.g., multiple cells in the row of the RRC-configured table, where each cell corresponds to a TDRA and has a TDRA index). For each TDRA index, the DCI format "F" can also include a beam Information field or a TPC field.

In this illustration, the total number of beam Information or TPC fields in a DCI format "F," denoted as K, maybe configured by RRC signaling. Fields that are not used may be reserved. For instance, referring to the illustrated table in FIG. 10, assumes that a detected DCI indicates row index "0." The NCR can determine, from the table, three TDRA indices. As such, three pairs of <beam information, TPC command> are indicated in the DCI, where each pair corresponds to one of the three TDRA indices. Also assuming that K is equal to eight, the remaining five <beam information, TPC command> fields in the DCI can be reserved (and, possibly, repurposed for other usage).

Accordingly, the NCR stores configuration information indicating TDRAs. From the gNB and over a control link, the NCR receives link, SCI indicating an entry in the configuration information, beam information, and a TPC command. The beam information and the TPC command can correspond to a first TDRA indicated by the entry. The TPC command indicates a first transmit output power and/or a first amplifying gain. The NCR determines the first TDRA from the entry based on a look-up of the configuration information. Then, the NCR transmits a first signal over a forwarding link based on the first TDRA, the first beam information, and the first TPC command. In the illustration of Figure the configuration information is stored as a table configured by the gNB for the NCR. Each row of the table includes a same or different number of TDRAs. The SCI indicates a row index and is includes in DCI having a total number of beam information fields or TPC command fields. The total number is configured by the gNB for the NCR.

Figure 11:
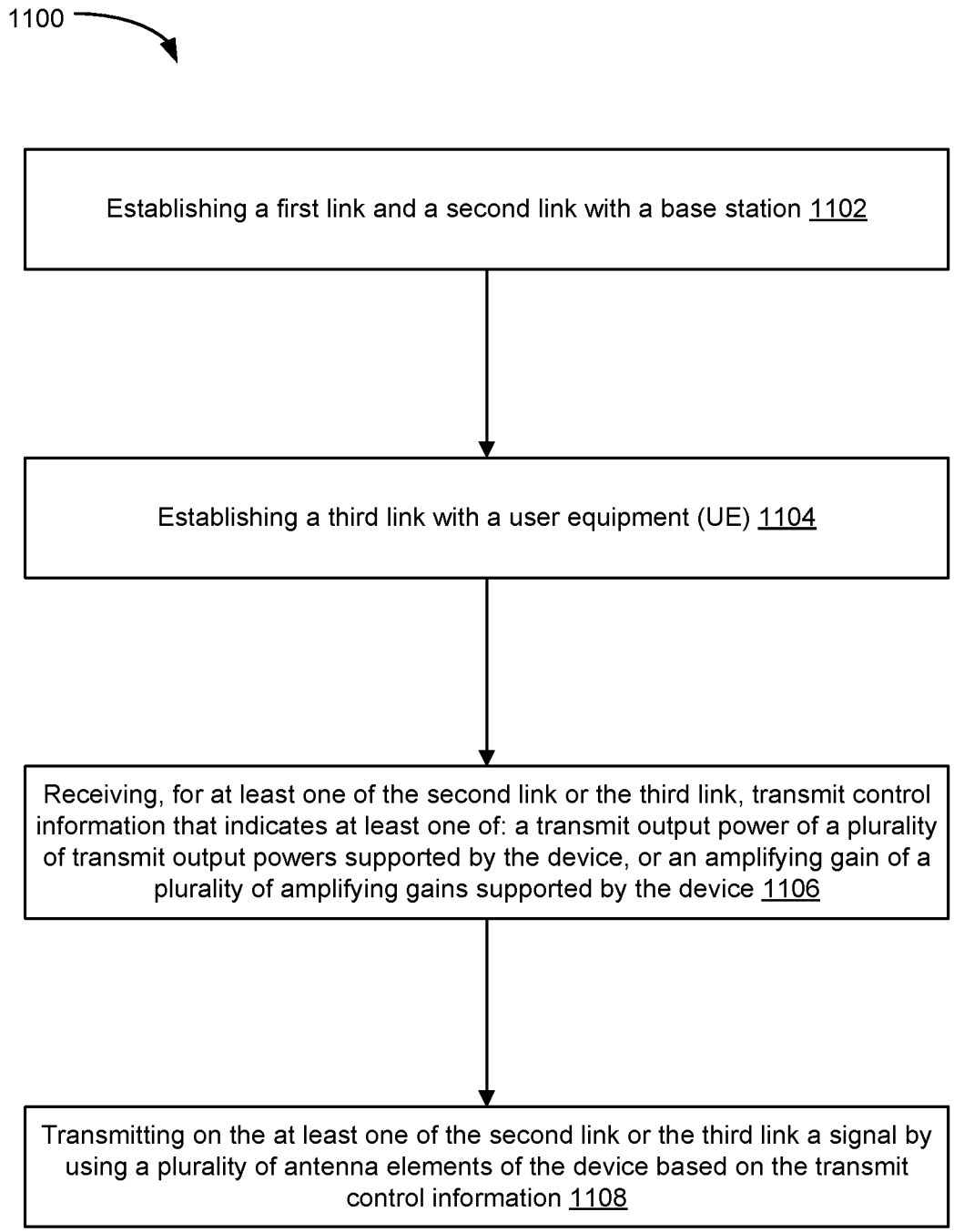
FIG. 11 illustrates an example of an operational flow/algorithmic structure for transmission power controls, in accordance with some embodiments.

FIG. 11 illustrates an example of an operational flow/algorithmic structure 1100 for transmission power controls, in accordance with some embodiments. A device, such as an NCR as described herein above or components thereof, such as processors 1304, can implement the operational flow/algorithmic structure 1100.

In an example, the operational flow/algorithmic structure 1100 includes, at 1102, establishing a first link and a second link with a base station. For instance, the device and the base station perform a connection procedure, whereby a control link is established as the first link and a backhaul link is established as the second link.

In an example, the operational flow/algorithmic structure 1100 includes, at 1104, establishing a third link with a UE. For instance, the device and the UE perform another connection procedure, whereby an access link is established as the third link.

In an example, the operational flow/algorithmic structure 1100 includes, at 1106, receiving, for at least one of the second link or the third link, transmit control information that indicates at least one of: a transmit output power of a plurality of transmit output powers supported by the device, or an amplifying gain of a plurality of amplifying gains supported by the device. For instance, the transmit control information is determined implicitly based on a signal type of a channel type as illustrated in FIG. 5. In another illustration, the transmit control information can be indicated explicitly by the base station, whereby this transmit control information can be included in a DCI as illustrated in FIGS. 6-8 or distributed between RRC messages and DCI as illustrated in FIGS. 9-10.

In an example, the operational flow/algorithmic structure 1100 includes, at 1108, transmitting on the at least one of the second link or the third link a signal by using a plurality of antenna elements of the device based on the transmit control information. For instance, a radio unit of the device uses beamforming techniques to send one or more RF signals, each of which may encode the same or different sets of symbols.

Figure 12:
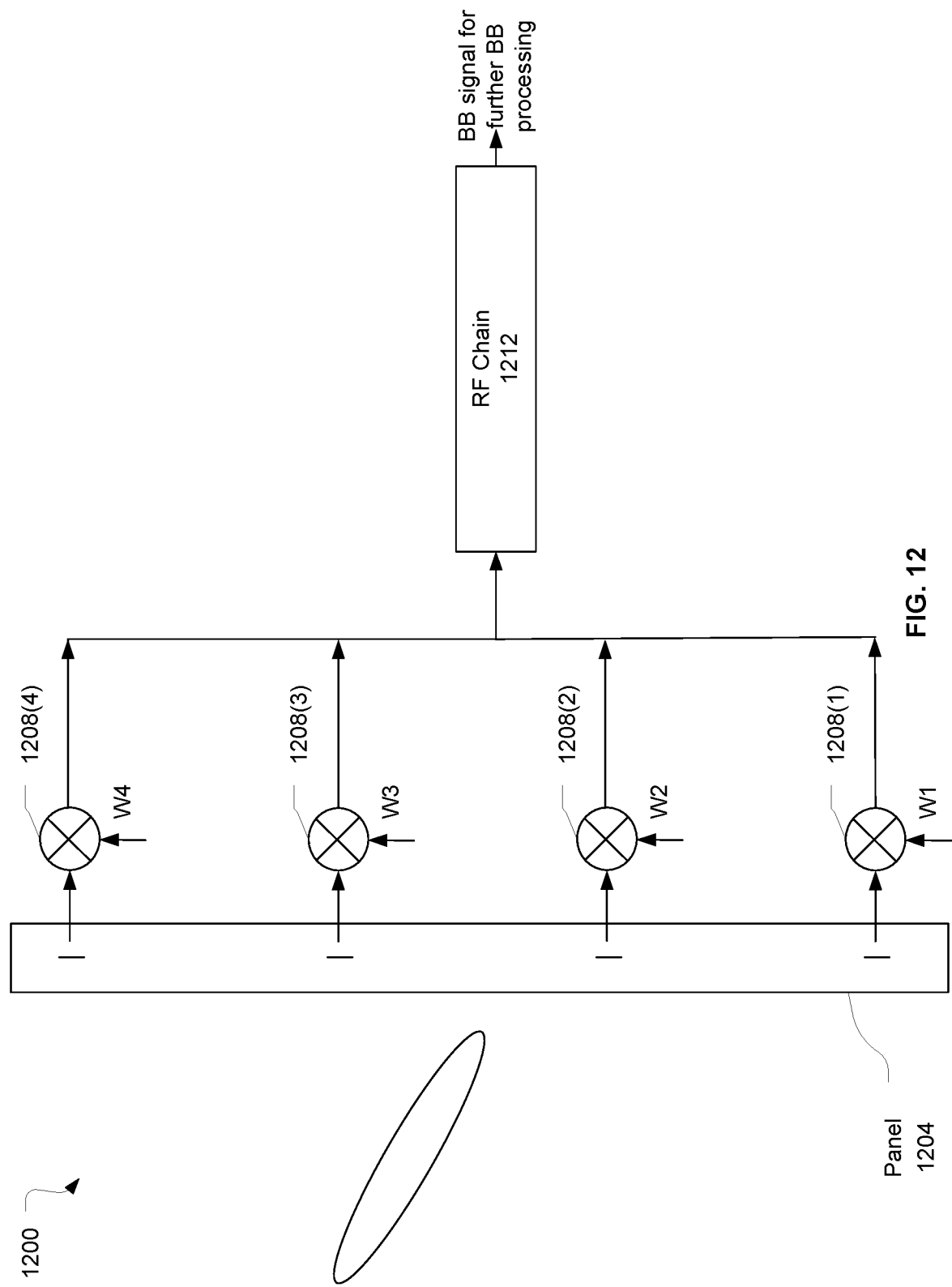
FIG. 12 illustrates an example of receive components, in accordance with some embodiments.

FIG. 12 illustrates receive components 1200 of the UE 104, in accordance with some embodiments. A network coverage device, such as an NCR, can include similar receive components. The receive components 1200 may include an antenna panel 1204 that includes a number of antenna elements. The panel 1204 is shown with four antenna elements, but other embodiments may include other numbers.

The antenna panel 1204 may be coupled to analog beamforming (BF) components that include a number of phase shifters 1208(1)-1208(4). The phase shifters 1208(1)-1208(4) may be coupled with a radio-frequency (RF) chain 1212. The RF chain 1212 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1208(1)-1208(4) to provide a receive beam at the antenna panel 1204. These BF weights may be determined based on the channel-based beamforming.

Figure 13:
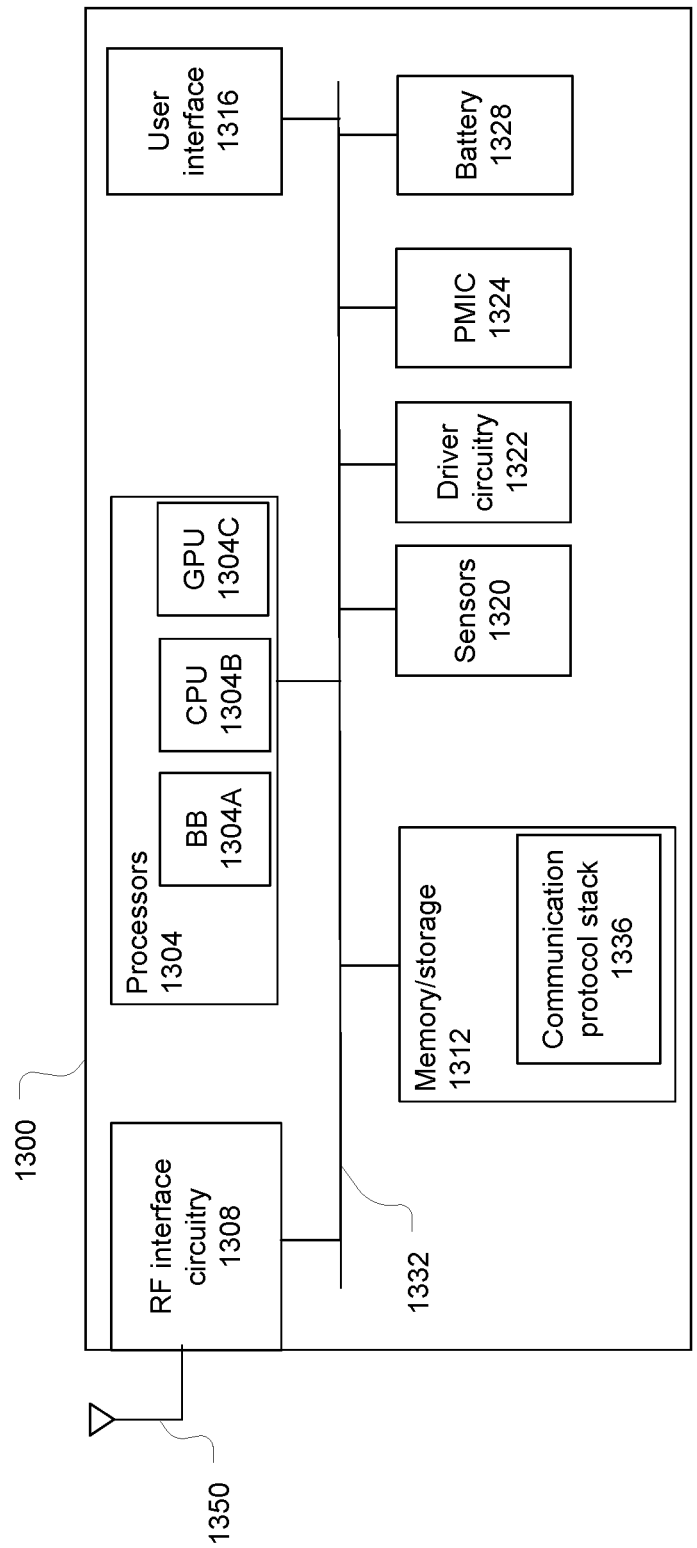
FIG. 13 illustrates an example of a UE, in accordance with some embodiments.

FIG. 13 illustrates a UE 1300, in accordance with some embodiments. The UE 1300 may be similar to and substantially interchangeable with UE 104 of FIG. 1. A network coverage device, such as an NCR, can include similar components, including for instance, processors, memory, and RF interface circuitry.

Similar to that described above with respect to UE 104, the UE 1300 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1300 may include processors 1304, RF interface circuitry 1308, memory/storage 1312, user interface 1316, sensors 1320, driver circuitry 1322, power management integrated circuit (PMIC) 1324, and battery 1328. The components of the UE 1300 may be implemented as integrated circuits (ICs), portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangements of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry, such as baseband processor circuitry (BB) 1304A, central processor unit circuitry (CPU) 1304B, and graphics processor unit circuitry (GPU) 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1304A may also access group information from memory/storage 1312 to determine search space groups in which a number of repetitions of a PDCCH may be transmitted.

The memory/storage 1312 may include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory, such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1308 may include transceiver circuitry and a radio frequency front module (RFEM) that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1350 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1350.

In various embodiments, the RF interface circuitry 1308 may be configured to transmit/receive signals in a manner compatible with NR access technologies.

The antenna 1350 may include a number of antenna elements that each convert electrical signals into radio waves to travel through the air and to convert received radio waves into electrical signals. The antenna elements may be arranged into one or more antenna panels. The antenna 1350 may have antenna panels that are omnidirectional, directional, or a combination thereof to enable beamforming and multiple input, multiple output communications. The antenna 1350 may include microstrip antennas, printed antennas fabricated on the surface of one or more printed circuit boards, patch antennas, phased array antennas, etc. The antenna 1350 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The PMIC 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC Idle state, where it disconnects from the network and does not perform operations, such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location and may have a power supply coupled to an electrical grid. The battery 1328 may be a lithium-ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
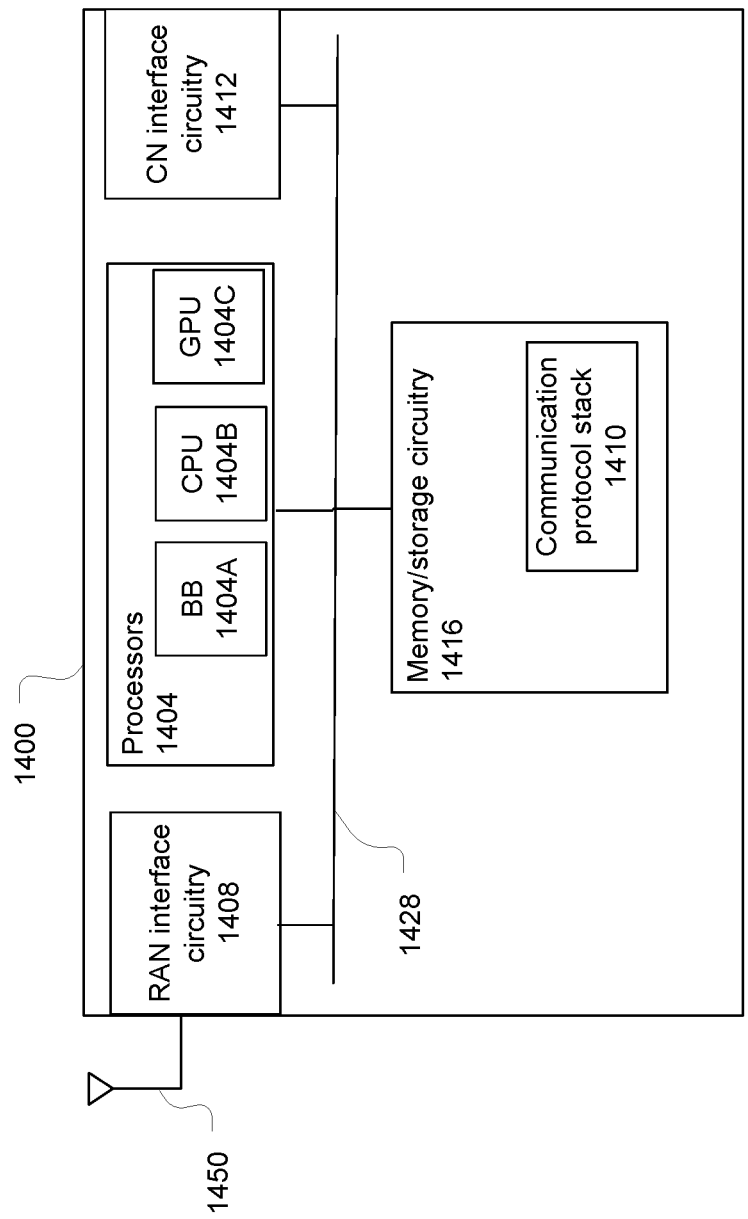
FIG. 14 illustrates an example of a base station, in accordance with some embodiments.

FIG. 14 illustrates a gNB 1400, in accordance with some embodiments. The gNB 1400 may be similar to and substantially interchangeable with the gNB 108 of FIG. 1.

The gNB 1400 may include processors 1404, RAN interface circuitry 1408, core network (CN) interface circuitry 1412, and memory/storage circuitry 1416.

The components of the gNB 1400 may be coupled with various other components over one or more interconnects 1428.

The processors 1404, RAN interface circuitry 1408, memory/storage circuitry 1416 (including communication protocol stack 1410), antenna 1450, and interconnects 1428 may be similar to like-named elements shown and described with respect to FIG. 13.

The CN interface circuitry 1412 may provide connectivity to a core network, for example, a Fifth Generation Core network (5GC) using a 5GC-compatible network interface protocol, such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented on a network-controlled device, the method comprising: establishing a control link and a backhaul link with a base station; establish an access link with a user equipment (UE); receiving, for at least one of the backhaul link or the access link, transmitting control information that indicates at least one of: a transmit output power of a plurality of transmit output powers supported by the NCR, or an amplifying gain of a plurality of amplifying gains supported by the NCR; and transmitting on the at least one of the backhaul link or the access link a signal by using a plurality of antenna elements of the network-controlled device based on the transmit control information.

Example 2 includes the method of example 1, wherein the method further comprises: determining the transmit output power or the amplifying gain from a set of transmit configurations, wherein the set of transmit configurations comprises at least one of: N output powers or N amplifying gains, wherein N is an integer equal to or greater than two, and wherein the set of configurations is configured for the NCR via radio resource control (RRC) signaling by the base station over the control link, via operations and management (OAM) activities, or is predefined in specification.

Example 3 includes the method of any preceding example, wherein the method further comprises: determining, for the access link, at least one of a first transmit output power or a first amplifying gain from a set of transmit configurations, wherein the set of transmit configuration comprises at least one of: N output powers or N amplifying gains, wherein N is an integer equal to or greater than two; determining, for the backhaul link, at least one of a second transmit output power or a second amplifying gain from the set of transmit configurations; transmitting a first signal over the access link based on the at least one of the first transmit output power or the first amplifying gain; and transmitting a second signal over the backhaul link based on the at least one of the second transmit output power or the second amplifying gain.

Example 4 includes the method of any preceding example, wherein the method further comprises: determining, for the access link, at least one of a first transmit output power or a first amplifying gain from a first set of transmit configurations; determining, for the backhaul link, at least one of a second transmit output power or a second amplifying gain from a second of transmit configurations; transmitting a first signal over the access link based on the at least one of the first transmit output power or the first amplifying gain; and transmitting a second signal over the backhaul link based on the at least one of the second transmit output power or the second amplifying gain.

Example 5 includes the method of any preceding example, wherein a first signal type or a first channel type associated with the access link and a second signal type or a second channel type associated with the backhaul link are associated with a first group, wherein a third signal type or a third channel type associated with at least one of the access link or the backhaul link are associated with a second group, wherein the first group is associated with a first transmit configuration that indicates at least one of a first transmit output power or a first amplifying gain, and wherein the second group is associated with a second transmit configuration that indicates at least one of a second transmit output power or a second amplifying gain.

Example 6 includes the method of example 5, wherein the method further includes determining that a transmission to be performed is associated with the first group instead of the second group; determining the first transmit configuration associated with the first group; and performing the transmission based on the first transmit configuration.

Example 7 includes the method of example 5 or 6, wherein the first group is associated with synchronization signal block (SSB) signals on the access link, system information block (SIB) signals on the access link, and physical random access channel (PRACH) resources on the backhaul link.

Example 8 includes the method of example 5, 6, or 7, wherein the first transmit configuration and the second transmit configuration are pre-stored by the NCR based on a predefined specification or are indicated to the NCR by the base station using radio resource control (RRC) signaling or media access control (MAC) control element (CE) signaling over the control link.

Example 9 includes the method of example 5, 6, 7, or 8, wherein the first group is associated with wider transmission beams relative to the second group, and wherein at least one of: the first transmit output power is greater than the second transmit output power or the first amplifying gain is greater than the second amplifying gain.

Example 10 includes a method implemented on a device, the method comprising: establishing a first link and a second link with a base station; establishing a third link with a user equipment (UE); receiving, for at least one of the second link or the third link, transmit control information that indicates at least one of: a transmit output power of a plurality of transmit output powers supported by the device, or an amplifying gain of a plurality of amplifying gains supported by the device; and transmitting on the at least one of the second link or the third link a signal by using a plurality of antenna elements of the device based on the transmit control information.

Example 11 includes the method of example 10, wherein the method further comprises: receiving, from the base station over the first link, information indicating side control information (SCI) radio network temporary identifier (RNTI) (SCI-RNTI) for monitoring a physical downlink control channel (PDCCH) conveying downlink control information (DCI) format with CRC scrambled by SCI-RNTI that is used to indicate at least the transmit control information and beam information, periodicity for monitoring the DCI, and granularity of time-domain resources for applying the transmit control information and the beam information.

Example 12 includes the method of example 11, wherein a set of time-domain resource granularities are pre-stored by the device based on a technical specification, and wherein the granularity is configured for the device from the set of time-domain resource granularities based on radio resource control (RRC) signaling from the base station to the device over the first link.

Example 13 includes the method of example 10, 11 or 12, wherein the transmit control information represents a transmission power control (TPC) command, and wherein the method further comprises: receiving, from the base station over the first link, downlink control information (DCI) format with CRC scrambled by SCI-RNTI, wherein the DCI includes sidelink control information (SCI) block fields, and wherein each SCI block field indicates the transmit control information and beam information.

Example 14 includes the method of example 13, wherein the DCI format includes B SCI block fields, wherein the B SCI block fields have one-to-one associations with B Y-symbols resources within a DCI monitoring periodicity, wherein each SCI block field includes a beam information field having $Z_B$ bits and a TPC command field having $Z_P$ bits, wherein B is equal to a periodicity for DCI monitoring divided by Y, wherein $Z_B$ is based on a total number of candidate beams, and wherein $Z_P$ is equal to $\log_2 M$ where M represents a total number of configurable transmit output powers or configurable amplifying gains Example 15 includes the method of example 14, wherein the method further comprises: determining a first SCI block field included in the DCI; determining a first beam information and a first TPC command indicated by the first SCI block; determining that first Y consecutive symbols within a periodicity for DCI monitoring are to be transmitted and are associated with the first SCI block; and transmitting the first Y consecutive symbols based on the first beam information and the first TPC command.

Example 16 includes the method of example 14, wherein the method further comprises: determining a first SCI block field included in the DCI; determining first beam information and a first TPC command indicated by the first SCI block field, wherein the first TPC command indicates at least one of a first transmit output power or a first amplifying gain; determining that first Y consecutive symbols are to be transmitted, are associated with the first SCI block field, and correspond to a signal type; determining that the signal type is associated with at least one of a second transmit output power that is different from the first transmit output power or a second amplifying gain that is different from the first amplifying gain; and transmitting the first Y consecutive symbols based on the at least one of the second transmit output power or the second amplifying gain Example 17 includes the method of example 14, wherein the method further comprises: determining a first SCI block field included in the DCI; determining that the first SCI block field does not indicate at least one of first beam information or a first TPC command; determining that first Y consecutive symbols are associated with the first SCI block; forgoing a transmission of the first Y consecutive symbols based on the first SCI block not indicating at least one of the first beam information or the first TPC command.

Example 18 includes the method of example 13, wherein the DCI format indicates N SCI block fields, wherein N is a positive integer indicated via radio resource control (RRC)

signaling received by the device from the base station over the first link or is determined by the device based on a DCI monitoring periodicity, and wherein each SCI block field includes a time domain resource allocation (TDRA) field, and a beam information field, and a TPC command field.

Example 19 includes the method of example 18, wherein the DCI format further indicates a slot offset indicator (SOI) field, wherein the SOI field indicates an offset relative to a start of a slot where the DCI is detected, wherein a first TDRA field in a first SCI block of the DCI indicates a starting symbol relative to a first symbol of the slot indicated by the SOI field and a first total number of symbols, wherein a second TDRA field of a second SCI block of the DCI indicates a second total number of symbols starting from an ending symbol indicated by the first TDRA field.

Example 20 includes the method of example 18, wherein each SCI block field further includes a slot offset indicator (SOI) field indicating an offset of a TDRA associated with the SCI block field relative to a start of a slot where the DCI is detected or relative to an ending symbol of a previous TDRA associated with a different SCI block field.

Example 21 includes the method of example 10, wherein the method further comprises: storing configuration information for a set of configurations, wherein each configuration indicates one or more side control information (SCI) blocks, wherein each SCI block indicates a corresponding time domain resource allocation (TDRA), corresponding beam information, and a corresponding transmission power control (TPC) command; receiving, from the base station over the first link, SCI indicating an entry that is associated with a configuration in the set of configurations; determining, for each SCI block associated with the indicated entry, a first TDRA, a first beam information, and a first TPC command, wherein the first TPC command indicates at least one of a first transmit output power or a first amplifying gain; and transmitting, for each SCI block associated with the indicated entry, a first signal over the second link or the third link based on the first TDRA, the first beam information, and the first TPC command.

Example 22 includes the method of example 21, wherein the configuration information is stored as a table configured by the base station for the device, wherein each row of the table includes a same or different number of SCI blocks, and wherein the SCI field in DCI format indicates a row index of the table.

Example 23 includes the method of example 10, wherein the method further comprises: storing configuration information for a set of configurations, wherein each configuration has an index in the configuration information and indicates a corresponding set of time domain resource allocations (TDRAs); receiving, from the base station over the first link, SCI information in a DCI format including a TDRA field that includes an index of a configuration of the set of configurations, wherein the DCI format further includes beam information fields and TPC command fields; determining, based on the index, a set of TDRAs that correspond to the configuration; determining, based on the DCI format, beam information and TPC commands that correspond to the set of TDRAs; and transmitting a signal over the second link or the third link based on the set of TDRAs, the beam information, and the TPC commands.

Example 24 includes the method of example 23, wherein the configuration information is stored as a table configured by the base station for the device, wherein each row of the table includes a same or different number of TDRAs, corresponds to a different configuration of the set of configurations, and has a row index, wherein the TDRA field in the DCI format indicates a row index of the table, and wherein the total number of beam information fields or TPC command fields in the DCI format is configured by the base station for the device.

Example 25 includes a network-controlled device or a device comprising means to perform one or more elements of a method described in or related to any of the examples 11-24.

Example 26 includes one or more non-transitory computer-readable media comprising instructions to cause a network-controlled device or a device, upon execution of the instructions by one or more processors of the network-controlled device or the device, to perform one or more elements of a method described in or related to any of the examples 1-24.

Example 27 includes a network-controlled device or a device comprising logic, modules, or circuitry to perform one or more elements of a method described in or related to any of the examples 1-24.

Example 28 includes a network-controlled device or a device comprising: one or more processors and one or more computer-readable media comprising instructions that, when executed by the one or more processors, cause the one or more processors to perform one or more elements of a method described in or related to any of the examples 1-24.

Example 29 includes a system comprising means to perform one or more elements of a method described in or related to any of the examples 1-24.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A network-controlled repeater (NCR) comprising:
a plurality of antenna elements that provide beamforming capability of the NCR;
one or more processors; and
one or more memory storing instructions that, upon execution by the one or processors, configure the NCR to:
establish a control link and a backhaul link with a base station;
establish an access link with a user equipment (UE);
receive, for at least one of the backhaul link or the access link, transmit control information that indicates at least one of: a transmit output power of a plurality of transmit output powers supported by the NCR, or an amplifying gain of a plurality of amplifying gains supported by the NCR; and
transmit on the at least one of the backhaul link or the access link a signal by using the plurality of antenna elements based on the transmit control information.

2. The NCR of claim 1, wherein the execution of the instructions further configures the NCR to:
determine the transmit output power or the amplifying gain from a set of transmit configurations, wherein the set of transmit configurations comprises at least one of: N output powers or N amplifying gains, wherein N is an integer equal to or greater than two, and wherein the set of transmit configurations is configured for the NCR via radio resource control (RRC) signaling by the base station over the control link, via operations and management (OAM) activities, or is predefined in specification.

3. The NCR of claim 1, wherein the execution of the instructions further configures the NCR to:
determine, for the access link, at least one of a first transmit output power or a first amplifying gain from a set of transmit configurations, wherein the set of transmit configuration comprises at least one of: N output powers or N amplifying gains, wherein N is an integer equal to or greater than two;
determine, for the backhaul link, at least one of a second transmit output power or a second amplifying gain from the set of transmit configurations;
transmit a first signal over the access link based on the at least one of the first transmit output power or the first amplifying gain; and
transmit a second signal over the backhaul link based on the at least one of the second transmit output power or the second amplifying gain.

4. The NCR of claim 1, wherein the execution of the instructions further configures the NCR to:
determine, for the access link, at least one of a first transmit output power or a first amplifying gain from a first set of transmit configurations;
determine, for the backhaul link, at least one of a second transmit output power or a second amplifying gain from a second of transmit configurations;
transmit a first signal over the access link based on the at least one of the first transmit output power or the first amplifying gain; and
transmit a second signal over the backhaul link based on the at least one of the second transmit output power or the second amplifying gain.

5. The NCR of claim 1, wherein a first signal type or a first channel type associated with the access link and a second signal type or a second channel type associated with the backhaul link are associated with a first group, wherein a third signal type or a third channel type associated with at least one of the access link or the backhaul link are associated with a second group, wherein the first group is associated with a first transmit configuration that indicates at least one of a first transmit output power or a first amplifying gain, and wherein the second group is associated with a second transmit configuration that indicates at least one of a second transmit output power or a second amplifying gain.

6. The NCR of claim 5, wherein the execution of the instructions further configures the NCR to:
determine that a transmission to be performed is associated with the first group instead of the second group;
determine the first transmit configuration associated with the first group; and
perform the transmission based on the first transmit configuration.

7. The NCR of claim 5, wherein the first group is associated with synchronization signal block (SSB) signals on the access link, system information block (SIB) signals on the access link, and physical random access channel (PRACH) resources on the backhaul link.

8. The NCR of claim 5, wherein the first transmit configuration and the second transmit configuration are pre-stored by the NCR based on a predefined specification or are indicated to the NCR by the base station using radio resource control (RRC) signaling or media access control (MAC) control element (CE) signaling over the control link.

9. The NCR of claim 5, wherein the first group is associated with wider transmission beams relative to the second group, and wherein at least one of: the first transmit output power is greater than the second transmit output power or the first amplifying gain is greater than the second amplifying gain.

10. A method implemented on a device, the method comprising:
establishing a first link and a second link with a base station;
establishing a third link with a user equipment (UE);
receiving, for at least one of the second link or the third link, transmit control information that indicates at least one of: a transmit output power of a plurality of transmit output powers supported by the device, or an amplifying gain of a plurality of amplifying gains supported by the device; and
transmitting on the at least one of the second link or the third link a signal by using a plurality of antenna elements of the device based on the transmit control information.

11. The method of claim 10 further comprising:
receiving, from the base station over the first link, information indicating side control information (SCI) radio network temporary identifier (RNTI) (SCI-RNTI) for monitoring a physical downlink control channel (PDCCH) conveying downlink control information (DCI) format with CRC scrambled by SCI-RNTI that is used to indicate at least the transmit control information and beam information, periodicity for monitoring DCI, and granularity of time-domain resources for applying the transmit control information and the beam information.

12. The method of claim 11, wherein a set of time-domain resource granularities are pre-stored by the device based on a technical specification, and wherein a granularity is configured for the device from the set of time-domain resource granularities based on radio resource control (RRC) signaling from the base station to the device over the first link.

13. The method of claim 10, wherein the transmit control information represents a transmission power control (TPC) command, and wherein the method further comprises:
receiving, from the base station over the first link, downlink control information (DCI) format with CRC scrambled by SCI-RNTI, wherein the DCI format includes sidelink control information (SCI) block fields, and wherein each SCI block field indicates the transmit control information and beam information.

14. The method of claim 13, wherein the DCI format includes B SCI block fields, wherein the B SCI block fields have one-to-one associations with B Y-symbols resources within a DCI monitoring periodicity, wherein each SCI block field includes a beam information field having $Z_B$ bits and a TPC command field having $Z_P$ bits, wherein B is equal to a periodicity for DCI monitoring divided by Y, wherein $Z_B$ is based on a total number of candidate beams, and wherein $Z_P$ is equal to $\log_2 M$ where M represents a total number of configurable transmit output powers or configurable amplifying gains.

15. The method of claim 14 further comprising:
determining a first SCI block field included in DCI;
determining a first beam information and a first TPC command indicated by the first SCI block field;

determining that first Y consecutive symbols within a periodicity for DCI monitoring are to be transmitted and are associated with the first SCI block field; and transmitting the first Y consecutive symbols based on the first beam information and the first TPC command.

16. The method of claim 14 further comprising:

determining a first SCI block field included in DCI;

determining first beam information and a first TPC command indicated by the first SCI block field, wherein the first TPC command indicates at least one of a first transmit output power or a first amplifying gain;

determining that first Y consecutive symbols are to be transmitted, are associated with the first SCI block field, and correspond to a signal type;

determining that the signal type is associated with at least one of a second transmit output power that is different from the first transmit output power or a second amplifying gain that is different from the first amplifying gain; and transmitting the first Y consecutive symbols based on the at least one of the second transmit output power or the second amplifying gain.

17. The method of claim 13, wherein the DCI format indicates N SCI block fields, wherein N is a positive integer indicated via radio resource control (RRC) signaling received by the device from the base station over the first link or is determined by the device based on a DCI monitoring periodicity, and wherein each SCI block field includes a time domain resource allocation (TDRA) field, and a beam information field, and a TPC command field.

18. One or more non-transitory computer-readable storage media storing instructions that, upon execution on a device, cause the device to perform operations comprising:

establishing a first link and a second link with a base station;

establishing a third link with a user equipment (UE);

receiving, for at least one of the second link or the third link, transmit control information that indicates at least one of: a transmit output power of a plurality of transmit output powers supported by the device, or an amplifying gain of a plurality of amplifying gains supported by the device; and transmitting on the at least one of the second link or the third link a signal by using a plurality of antenna elements of the device based on the transmit control information.

19. The one or more non-transitory computer-readable storage media of claim 18, wherein the operations further comprise:

storing configuration information for a set of configurations, wherein each configuration indicates one or more side control information (SCI) blocks, wherein each SCI block indicates a corresponding time domain resource allocation (TDRA), corresponding beam information, and a corresponding transmission power control (TPC) command;

receiving, from the base station over the first link, SCI indicating an entry that is associated with a configuration in the set of configurations;

determining, for each SCI block associated with the indicated entry, a first TDRA, a first beam information, and a first TPC command, wherein the first TPC command indicates at least one of a first transmit output power or a first amplifying gain; and transmitting, for each SCI block associated with the indicated entry, a first signal over the second link or the third link based on the first TDRA, the first beam information, and the first TPC command.

20. The one or more non-transitory computer-readable storage media of claim 18, wherein the operations further comprise:

storing configuration information for a set of configurations, wherein each configuration has an index in the configuration information and indicates a corresponding set of time domain resource allocations (TDRAs);

receiving, from the base station over the first link, SCI information in a DCI format including a TDRA field that includes an index of a configuration of the set of configurations, wherein the DCI format further includes beam information fields and TPC command fields;

determining, based on the index, a set of TDRAs that correspond to the configuration;

determining, based on the DCI format, beam information and TPC commands that correspond to the set of TDRAs; and transmitting a signal over the second link or the third link based on the set of TDRAs, the beam information, and the TPC commands.

* * * * *